United States Patent
Upton et al.

(10) Patent No.: US 10,099,787 B2
(45) Date of Patent: *Oct. 16, 2018

(54) METHOD AND APPARATUS FOR CORRECTING FOR POWER HARMONICS

(71) Applicant: B/E AEROSPACE, INC., Wellington, FL (US)

(72) Inventors: Brendan Upton, East Patchogue, NY (US); Eric Johannessen, Holbrook, NY (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/408,848

(22) Filed: Jan. 18, 2017

(65) Prior Publication Data

US 2017/0210471 A1    Jul. 27, 2017

Related U.S. Application Data

(60) Provisional application No. 62/286,080, filed on Jan. 22, 2016.

(51) Int. Cl.
*H05B 33/08* (2006.01)
*B64D 11/00* (2006.01)
*H02M 1/12* (2006.01)

(52) U.S. Cl.
CPC .............. *B64D 11/00* (2013.01); *H02M 1/12* (2013.01); *H05B 33/0824* (2013.01); *H05B 33/0866* (2013.01); *B64D 2011/0038* (2013.01); *B64D 2203/00* (2013.01)

(58) Field of Classification Search
None
See application file for complete search history.

(56) References Cited

U.S. PATENT DOCUMENTS

| | | | |
|---|---|---|---|
| 9,800,049 B1* | 10/2017 | Sam | H02J 3/01 |
| 2010/0187914 A1 | 7/2010 | Rada et al. | |
| 2011/0089868 A1 | 4/2011 | Sauerlaender | |
| 2011/0292704 A1* | 12/2011 | Makino | H02M 1/4208 363/126 |
| 2012/0299560 A1 | 11/2012 | Gu | |
| 2014/0042926 A1 | 2/2014 | Melanson | |
| 2014/0320191 A1 | 10/2014 | Lee et al. | |

OTHER PUBLICATIONS

PCT Search Report and Written Opinion issued in related application PCT/US2017/013926, dated May 24, 2017, 14 pages.

* cited by examiner

*Primary Examiner* — Monica C King
*Assistant Examiner* — Jianzi Chen
(74) *Attorney, Agent, or Firm* — Donna P. Suchy

(57) ABSTRACT

The present disclosure is generally directed to a harmonics correction method and apparatus. In an embodiment, the method and apparatus are carried out in a light-emitting diode ("LED") lighting unit that includes a set or string of LED lights. According to an embodiment, the LED lighting unit is a line-replaceable unit ("LRU").

12 Claims, 31 Drawing Sheets

Input Voltage is a Sinusoidal Wave

LED Current is a constant current, which only conducts when VIN exceeds VLED

Define a sinusoidal current waveform that supports ILED

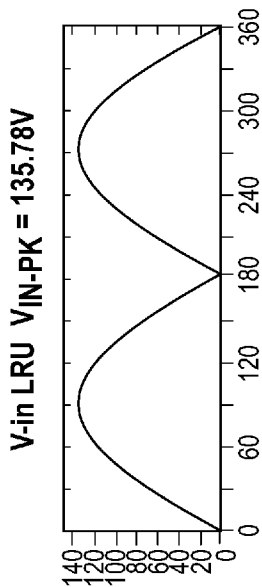
FIG. 20A V-in LRU $V_{IN-PK}$ = 135.78V
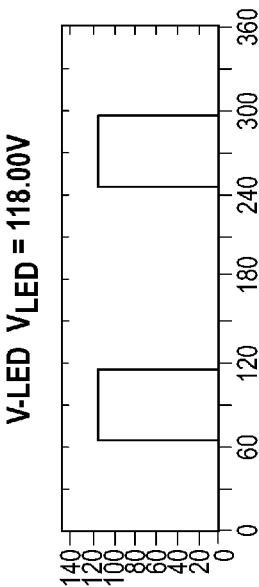
FIG. 20B V-LED $V_{LED}$ = 118.00V
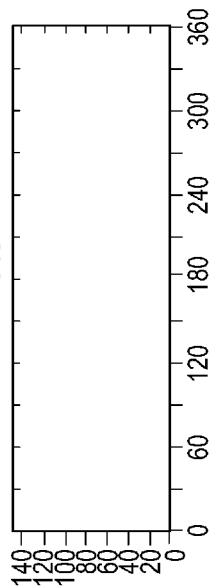
FIG. 20C V-Driver $V_{PK}$ = 1.60V
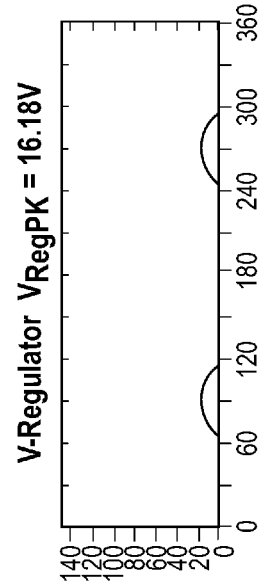
FIG. 20D V-Regulator $V_{RegPK}$ = 16.18V
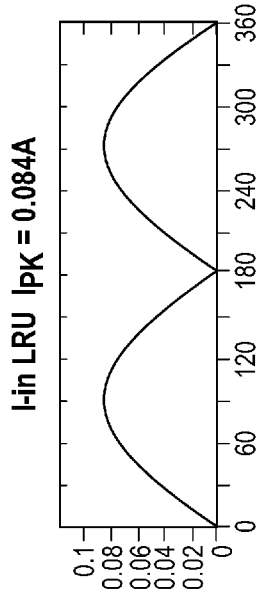
FIG. 20E I-in LRU $I_{PK}$ = 0.084A
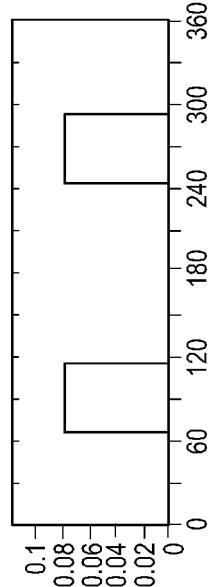
FIG. 20F I-LED $I_{LED}$ = 0.076A

METHOD AND APPARATUS FOR CORRECTING FOR POWER HARMONICS

CROSS-REFERENCE TO RELATED APPLICATIONS

The present application claims the priority benefit of U.S. Provisional Patent Application 62/286,080, filed on Jan. 22, 2016 and incorporated herein by reference.

TECHNICAL FIELD

The present disclosure relates generally to correction of electrical signals for characteristics such as harmonics and power factor.

BACKGROUND

There are many scenarios in which power harmonics can have a significant impact on an electrical system. One such scenario is on aircraft electrical systems. In an aircraft, particularly a passenger aircraft, unwanted harmonics in one system can have a negative impact on other systems and can also generate adverse electromagnetic field effects.

DRAWINGS

While the appended claims set forth the features of the present techniques with particularity, these techniques, together with their objects and advantages, may be best understood from the following detailed description taken in conjunction with the accompanying drawings of which:

Figure 1:
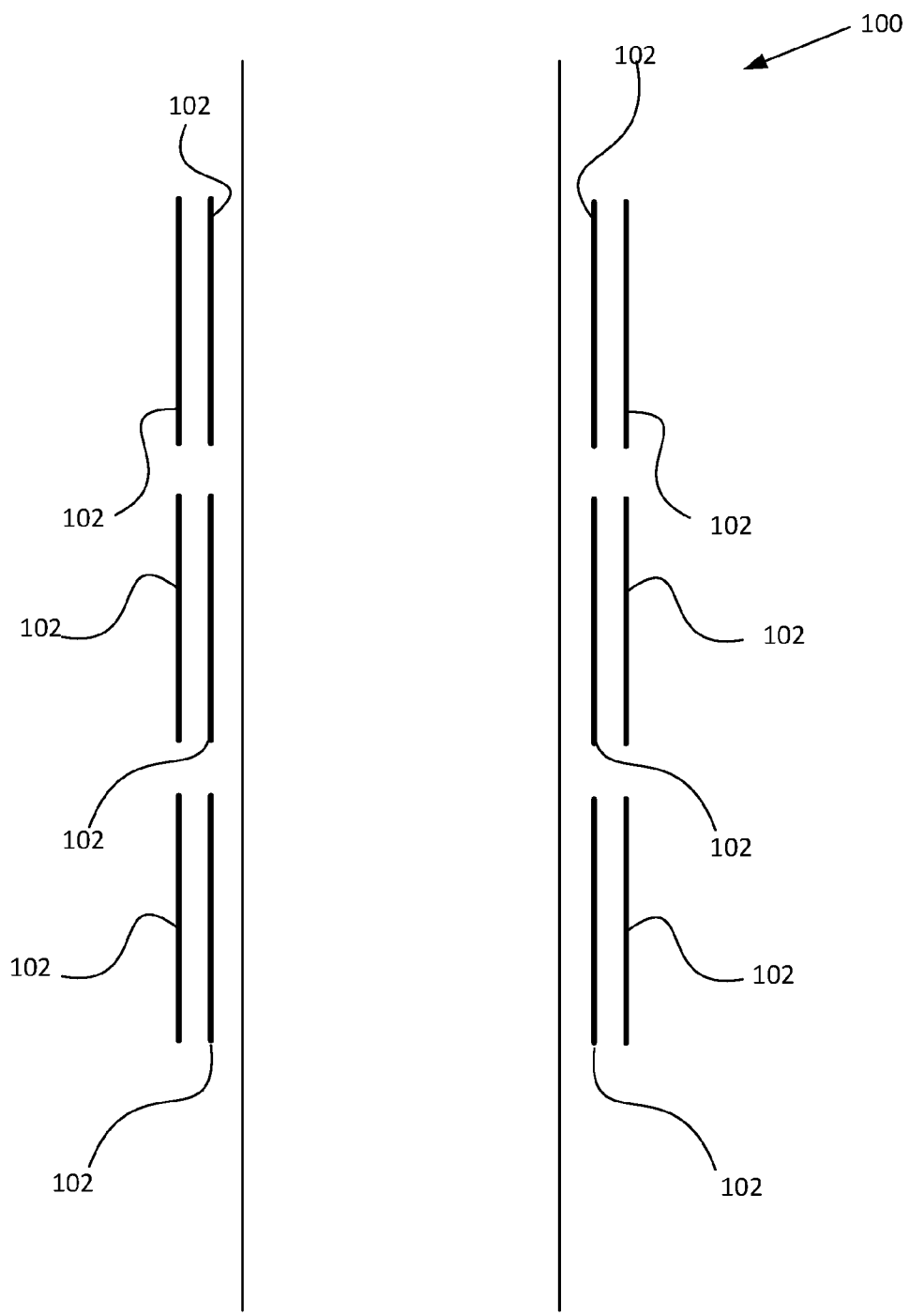
FIG. 1 is a block diagram of an aircraft lighting system in which various embodiments of the disclosure may be used.

FIG. 18, FIG. 19A, FIG. 19B, FIG. 19C, and FIG. 19D show example circuit implementations.

FIGS. 20A-20L depict waveforms showing the electrical performance of an embodiment of the LEDs and the LED driver at 97 Volts (root mean square) "VRMS."

FIGS. 21A-21J depict waveforms showing the electrical performance of an embodiment of a harmonics correction circuit at 97 VRMS.

FIGS. 22A-22L depict waveforms showing the electrical performance of an embodiment of the LEDs and the LED driver at 134 VRMS.

FIGS. 23A-23J depict waveforms showing the electrical performance of an embodiment of a harmonics correction circuit at 134 VRMS.

FIG. 24, FIG. 25, FIG. 26, FIG. 27, FIG. 28A, FIG. 28B, FIG. 28C, FIG. 29, and FIG. 30 depict various aspects of a lighting unit that employs an embodiment of a harmonics correction circuit.

DESCRIPTION

The present disclosure is generally directed to a harmonics correction method and apparatus. In an embodiment, the method and apparatus are carried out in an LED lighting unit that includes a set or string of LED lights. According to an embodiment, the LED lighting unit is a line-replaceable unit ("LRU").

LED strings normally draw square current waveforms. The ideal waveform for low harmonics is a sine wave. According to an embodiment, to correct for harmonic distortion and power factor, a harmonic and power factor correction circuit ("correction circuit") detects shape of an input waveform, detects the shape of the waveform at the output of a set of LED lights (e.g., an LED string), and draws a varying amount of current (more current or less current, depending on what is needed) to align the two waveforms in terms of shape and phase. To detect the shapes of the two waveforms in an embodiment, the correction circuit includes a differential circuit (such as a differential amplifier) that receives the two waveforms as inputs. The input waveform originates from a power source that is also providing current to the LED string. In an embodiment, the waveform at the output of the LED string is reflected as a voltage at a sense resistor, which is electrically coupled to a node through which the current as measured at the output of the group of LEDs passes. In an embodiment, when an LRU is present, the current waveform the LRU draws matches the current through the group of LED lights at the LED turn-on voltage In an embodiment, the correction circuit includes a voltage divider (e.g., a pair of resistors in series) to reduce the input waveform to a voltage suitable for the differential circuit. In an embodiment, the correction circuit further includes a ballast resistance (e.g., a ballast resistor) in the feedback path to provide an upper limit on the amount of current that passes through the transistor.

To correct for harmonic distortion and power factor, the correction circuit provides an output current of the differential circuit to a transistor that is disposed in a feedback path to the differential circuit. As the output current of the differential circuit varies, the resistance of the transistor varies, thereby helping to keep the two waveforms aligned. In an embodiment, the differential circuit acts to adjust the resistance of the transistor so that at the voltage level at which the LED lights turn on, the current through the ballast resistance matches the current being drawn through the LED lights.

In an embodiment, the current through the LED lights is driven by a constant current source and is set by a set resistor.

Turning to FIG. 1, a lighting system 100 in which an embodiment of the disclosure may be employed is shown. The system 100 is depicted as being deployed in a passenger cabin of an aircraft. The system 100 includes multiple lighting elements 102, each of which may be implemented as an LRU.

Figure 2:
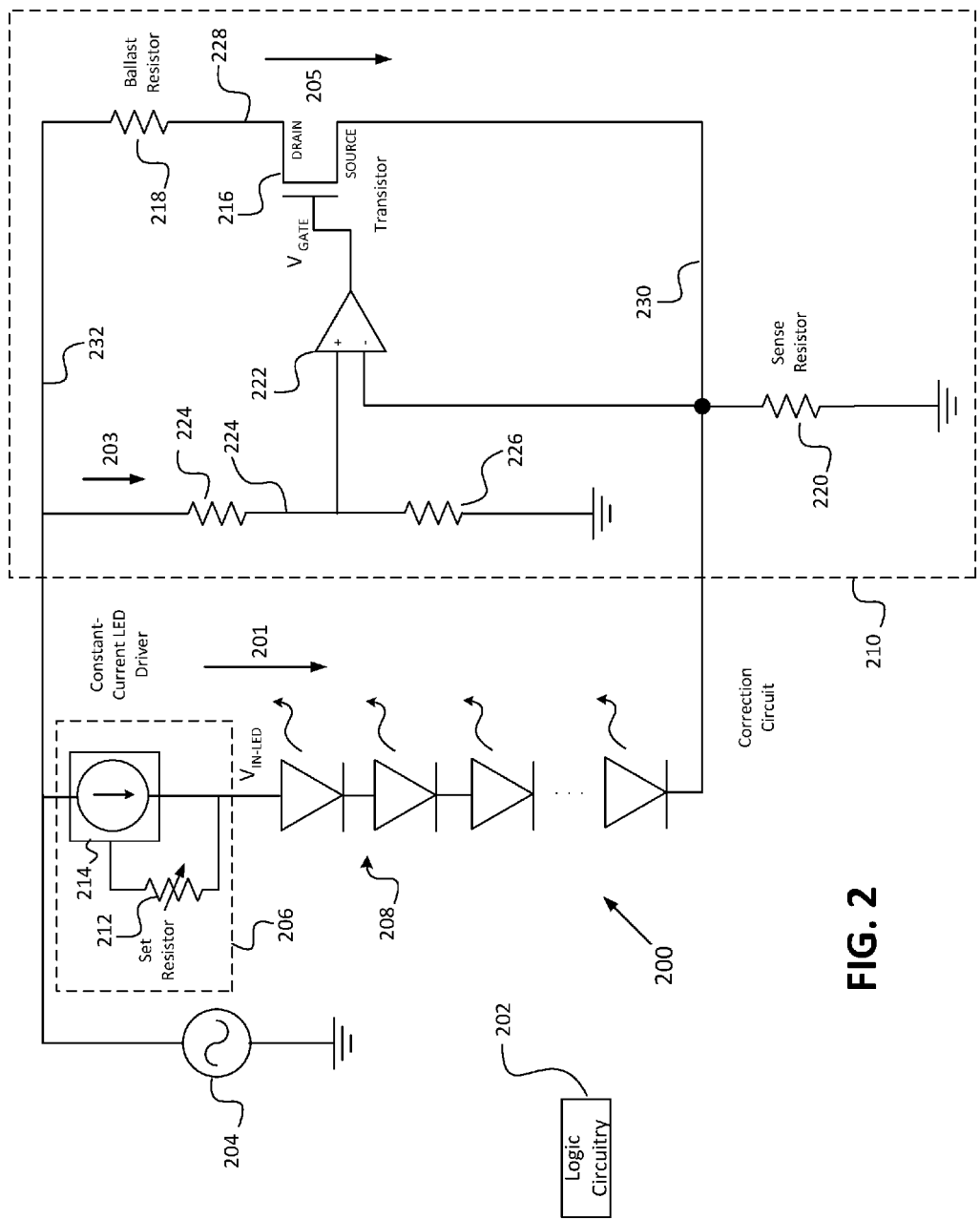
FIG. 2 is circuit diagram illustrating one possible embodiment.

Turning to FIG. 2, an LRU circuit, generally labeled 200, is controlled by logic circuitry 202. The LRU circuit 200 includes an alternating current ("AC") power source 204, a constant-current LED driver ("driver") 206, LED lights 208 (shown as being coupled in series), and a harmonic correction circuit ("circuit") 210. The logic circuitry 202 (e.g., microprocessor, microcontroller, application-specific integrated circuit ("IC"), or field-programmable gate array ("FPGA") controls the driver 206 to provide electrical power to the LED lights 208 at one or more frequencies and/or pulse widths in order to produce a particular lighting effect. In some embodiments, the logic circuitry 202 is located within an LRU along with the LRU circuit 200. The circuit 210, as will be described below in further detail, shapes the waveform of the signal within the LRU 200 so that the voltage and current waveforms closely or exactly match.

The driver 206 includes an LED driver 214 (e.g., a constant current generator suitable to drive LEDs) and a set resistor 212. The logic circuitry 202 adjusts the set resistor 212 to control the output colors and intensity of the LED lights 208.

In an embodiment, the logic circuitry 202 controls the LED driver 214 output to the LED lights 208 according to the following:

Desired Light Output:

$$CP := 210 \, \frac{\text{lm}}{\text{ft}} = 17.5 \, \frac{\text{lm}}{\text{in}}$$

Corrected for Lens Loss (Raw LED Output):

$$Loss_{Lens} := 10\%$$

$$CP_{LED} := \frac{CP}{1 - Loss_{Lens}} = 19.444 \, \frac{\text{lm}}{\text{in}}$$

Light Parameters:

$$Count_{LEDs} := 40$$

$$Length_{LRU} := 24 \text{ in}$$

$$L_{LED} := \frac{Length_{LRU}}{Count_{LEDs}} \Box CP_{LED} = 11.667 \text{ lm}$$

White LED Characteristics: $Vf_{Min}:=2.8$ V $Vf_{Max}:=2.95$ V $Flux_{Min}:=25.5$ lm $If_{Test}:=65$ mA The circuit 210 includes a transistor 216, a ballast resistor 218, a sense resistor 220, a differential amplifier ("amplifier") 222, a first divider resistor 224, and a second divider resistor 226. The transistor 216 is depicted as a metal-oxide-semiconductor field-effect transistor ("MOSFET"), but may be implemented in other ways (e.g., a bipolar junction transistor). The circuit 210 has a first node 232 and a second node 230. The circuit 210 includes a first current path 201 extending from the first node 232 to the second 230, a second current path 203 extending from the first node 232 to ground, and a third current path 205 extending from the first node 232 to the second node 230.

The gate of the transistor 216 is electrically coupled to the output of the amplifier 222, the drain of the transistor 216 is electrically coupled to a third node 228, and the source of the transistor 216 is electrically coupled to the second node 230.

The ballast resistor 218 is electrically coupled to the third node 228 and to the first node 232.

The harmonic sense resistor 220 is electrically coupled to the second node 230 and to ground.

Figure 3:
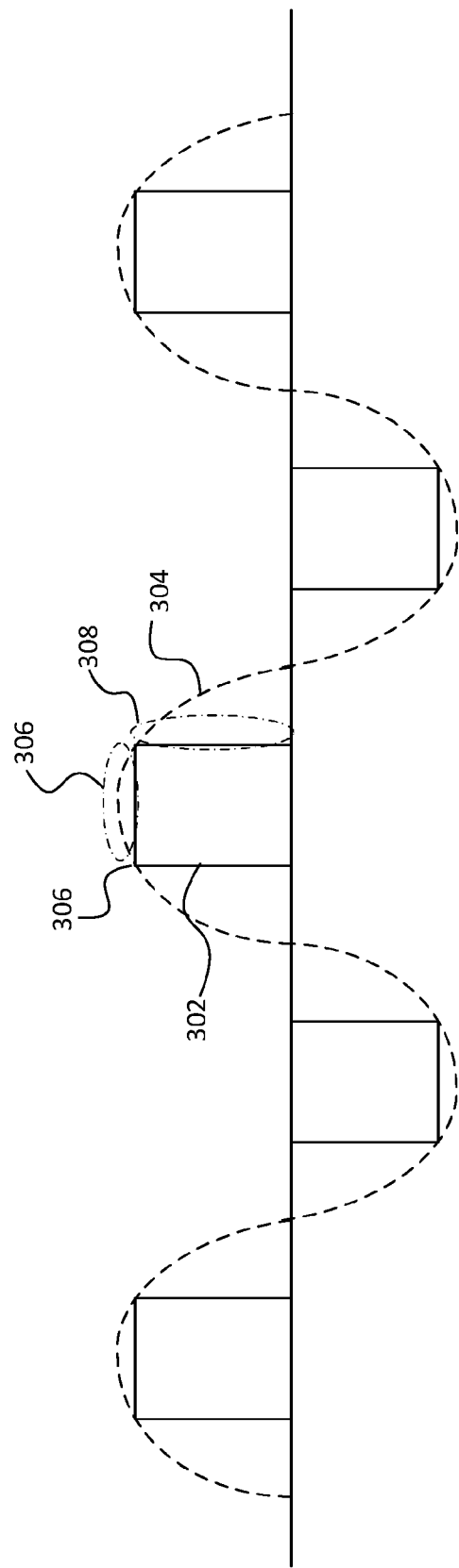
FIG. 3 depicts illustrative waveforms.
Figure 4:
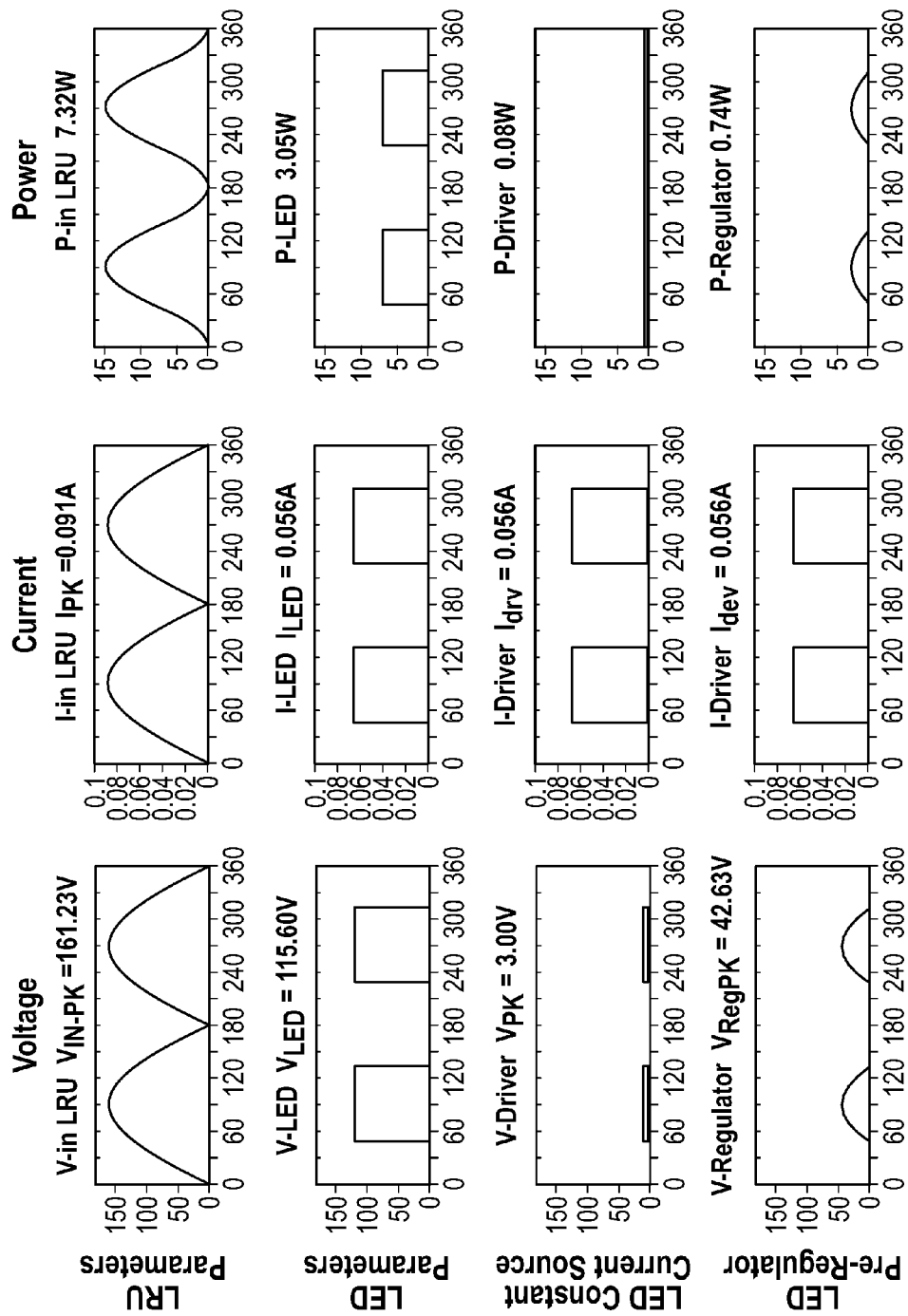
FIGS. 4-8 depict test data according to various embodiments.
Figure 5:
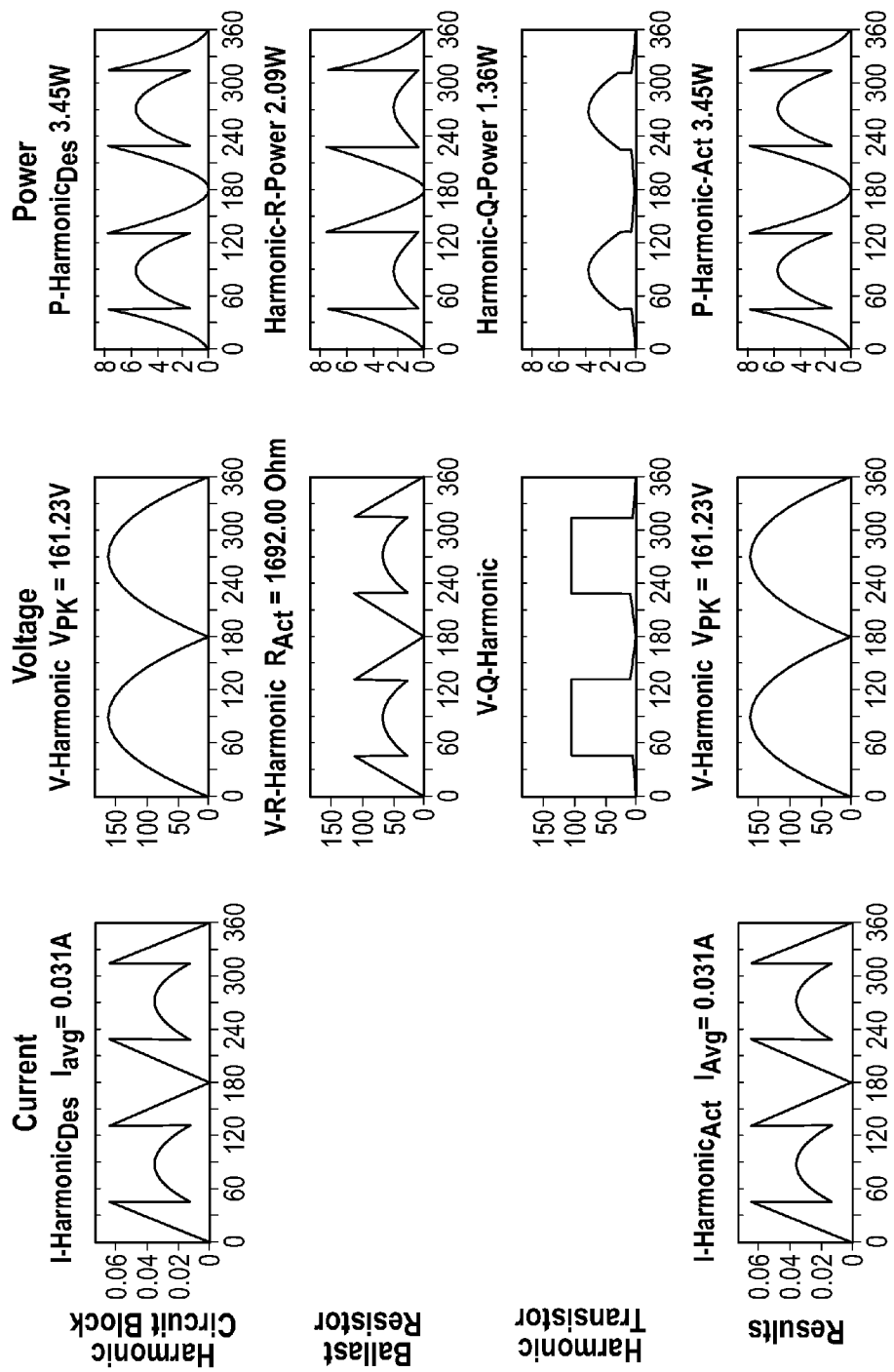
Figure 6:
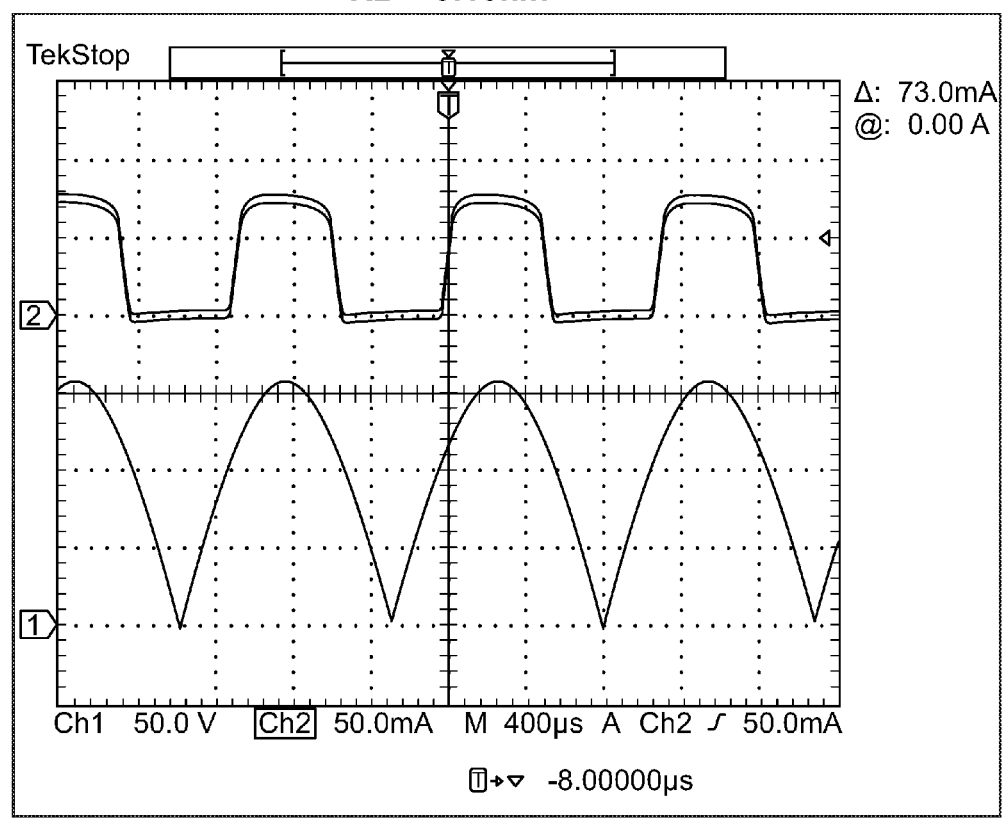
Figure 7:
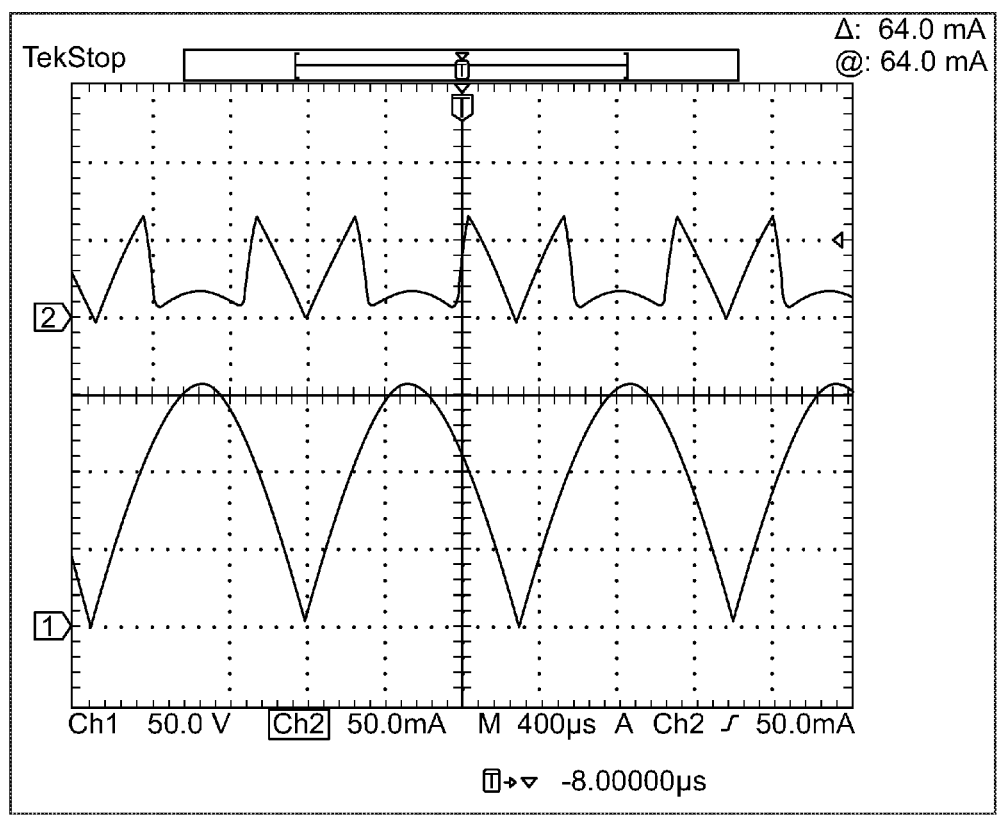
Figure 8:
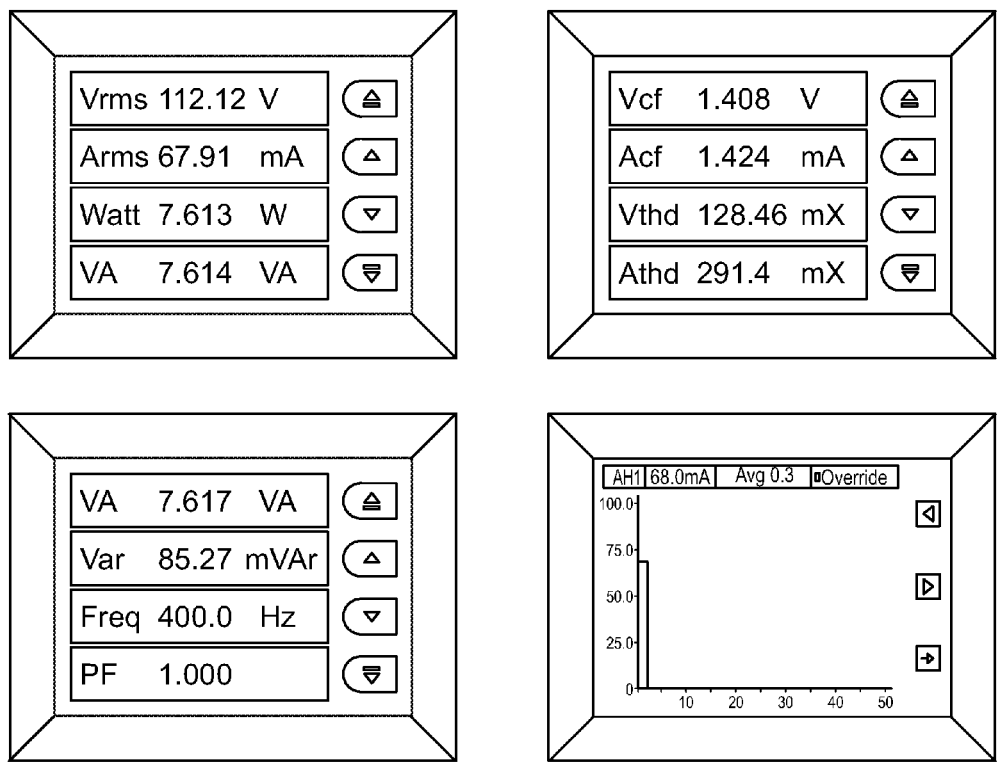

The operation of the LRU circuit 200 according to an embodiment will now be described with additional reference to FIG. 2 and FIG. 3. In FIG. 3, a square waveform 302 represents the current drawn by the LED lights 208 (current versus time), while a sinusoidal waveform 304 represents the input voltage experienced at the LED lights 208 (voltage versus time). It is to be understood that the operations described may happen in every cycle of the two waveforms even though only one half cycle is labeled in FIG. 3.

(1) The logic circuitry 202 controls the driver 206 to generate a signal having the voltage waveform 304. (2) When the voltage ($V_{IN-LED}$) input at the LED lights 208 equals the forward voltage ($V_{FWD-LED}$) of the LED lights 208 (location 306 of FIG. 3), current passes through the LED lights 208, and the LED lights 208 turn on. (3) When $V_{IN-LED}$ exceeds $V_{FWD-LED}$ (region 306 in FIG. 3), the resulting voltage change is reflected as a voltage change at the positive input of the amplifier 222. The amplifier 222 will attempt to drive transistor 216 such that the voltage produced across sense resistor 220 will match the voltage supplied by first and second divider resistors 224 and 226, resulting in a sinusoidal current waveform. (4) When $V_{IN-LED}$ drops back below $V_{FWD-LED}$ (region 308 in FIG. 3), the LED lights 208 turn off.

In an embodiment, the harmonic correction circuit 210 senses a current across the LEDs 208 by sensing a voltage whose waveform has a shape and a phase that represents the shape and phase of the waveform of the current. An example of representative waveforms are shown in FIGS. 9-12.

Figure 9:
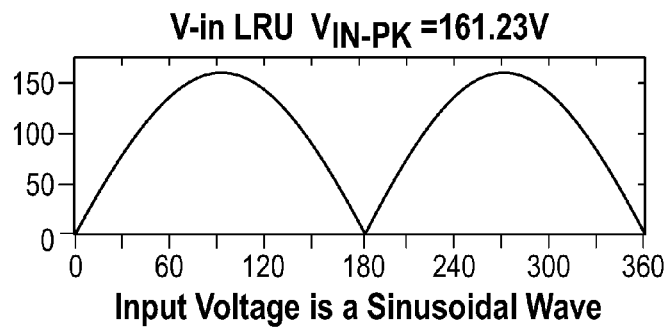
FIG. 9 depicts an input voltage waveform according to an embodiment.
Figure 10:
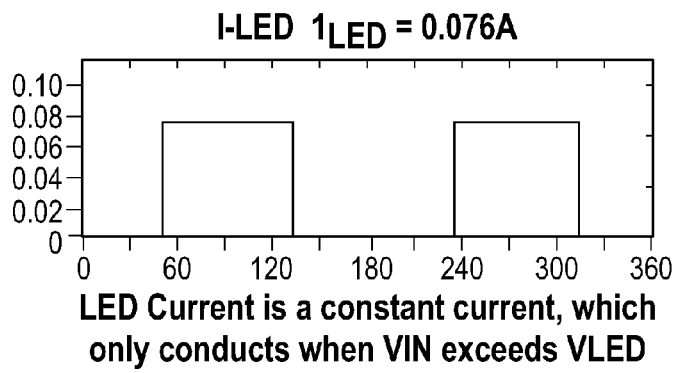
FIG. 10 depicts a light-emitting diode ("LED") current waveform according to an embodiment.
Figure 11:
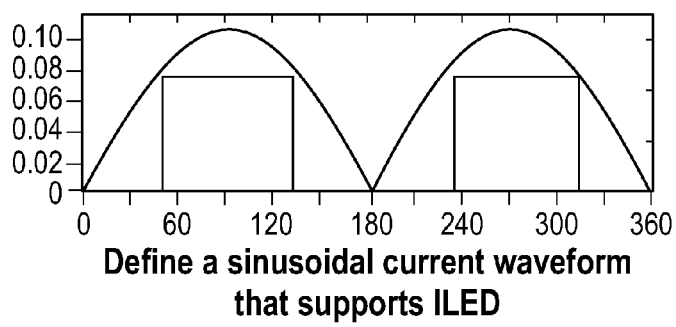
FIG. 11 depicts a sinusoidal current waveform that is superimposed on the current waveform of FIG. 10 and is defined to support the current waveform of FIG. 10.
Figure 12:
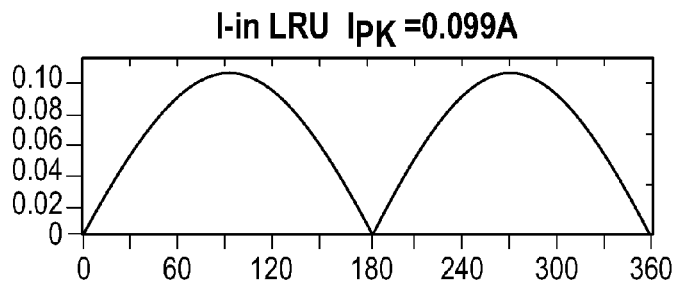
FIG. 12 depicts the sinusoidal waveform of FIG. 11 by itself.

FIG. 9 depicts the waveform of a voltage input to the lighting unit 200 according to an embodiment. FIG. 10 depicts the waveform of the current through the LEDs 208, according to an embodiment. FIG. 11 depicts a sinusoidal current waveform that is superimposed on the current waveform of FIG. 10 and is defined to support the current waveform of FIG. 10, according to an embodiment. In other words, the sinusoidal current waveform (shown by itself in FIG. 12) represents the square waveform. Consequently, the shape and phase of the voltage waveform across the sense resistor 220 represents the shape and phase of the current waveform shown in FIG. 10.

According to an embodiment, in order to eliminate or substantially eliminate power harmonics according to an embodiment, the load on the third circuit path 205 is adjusted (e.g., by adjusting load imparted by the transistor 216 as described herein). FIGS. 13-17 illustrate the various waveforms that occur as a result of the load on the third current path 205 being adjusted so that the appropriate current is drawn down the third circuit path 205.

Figure 13:
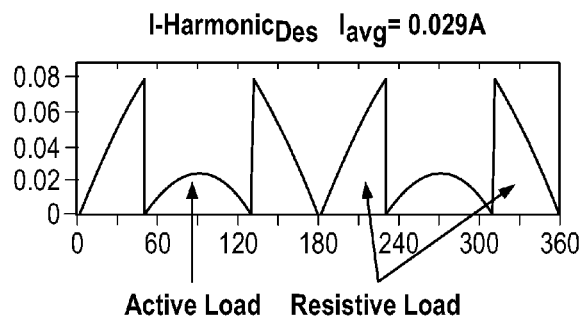
FIGS. 13-17 depict illustrative waveforms to illustrate the various waveforms that occur as a result of a load in the circuit that is parallel with the light-emitting diodes and which draws the current that is appropriate to eliminate or substantially eliminate power harmonics.
Figure 14:
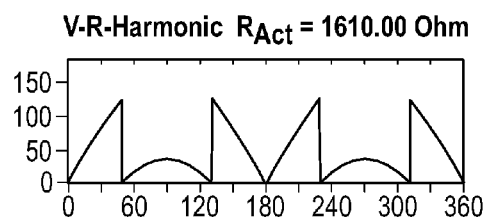
Figure 15:
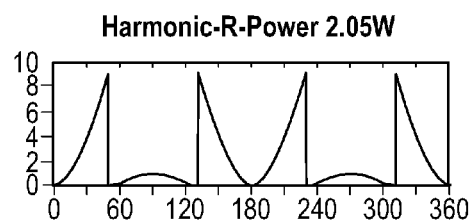
Figure 16:
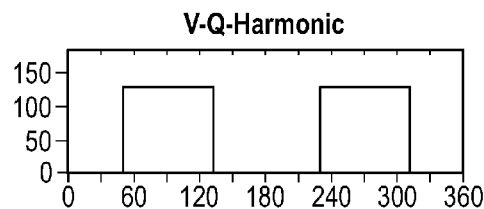
Figure 17:
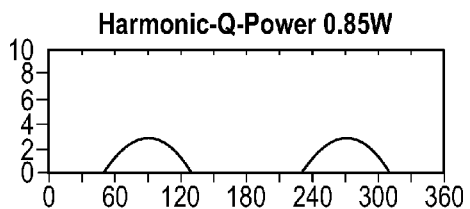

Referring to FIG. 13, for example, during the portion of the desired waveform that can be produced by a pure resistance, the transistor 216 will be fully turned on and the ballast resistor 218 will conduct the necessary current. During the portion of the waveform that the LEDs are conducting, the transistor 216 is adjusted actively so that the harmonic load draws the proper amount of current to match the input waveform.

Figure 18:
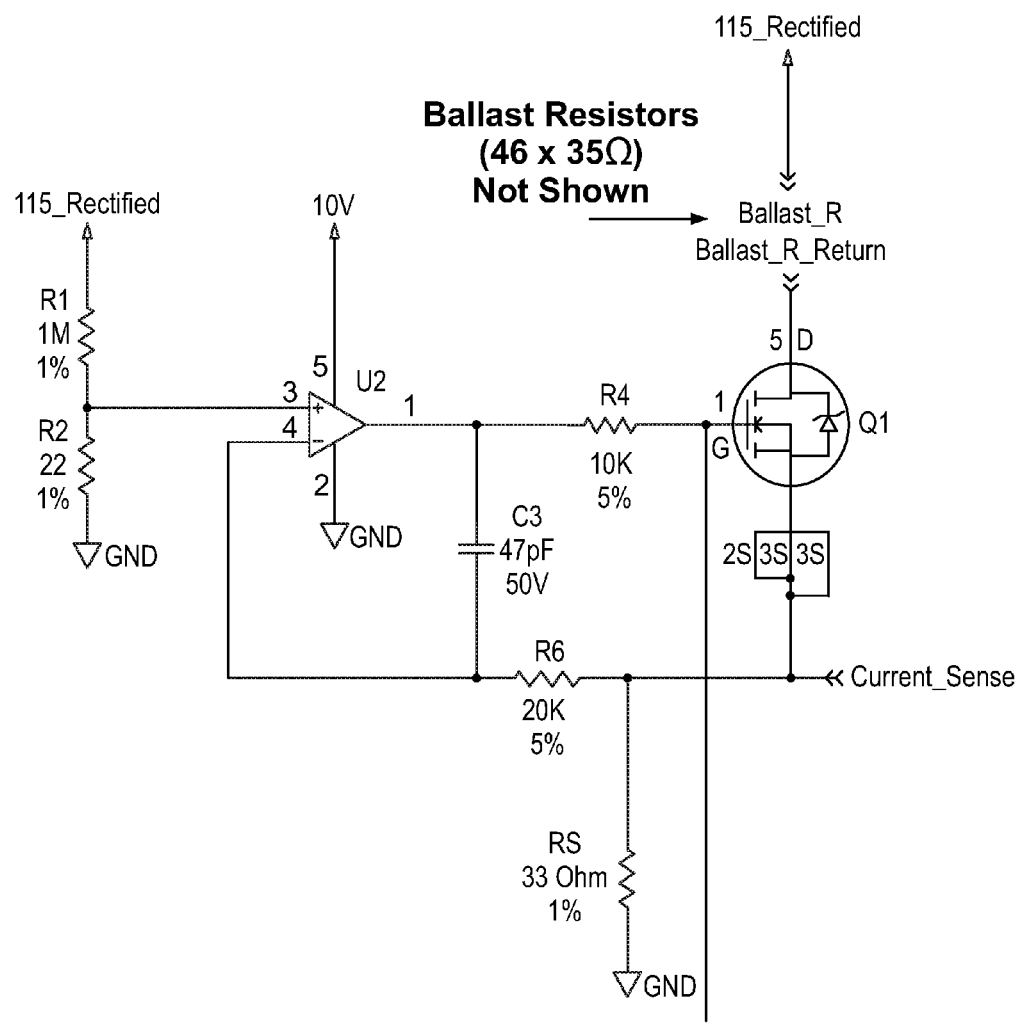
Figure 19A:
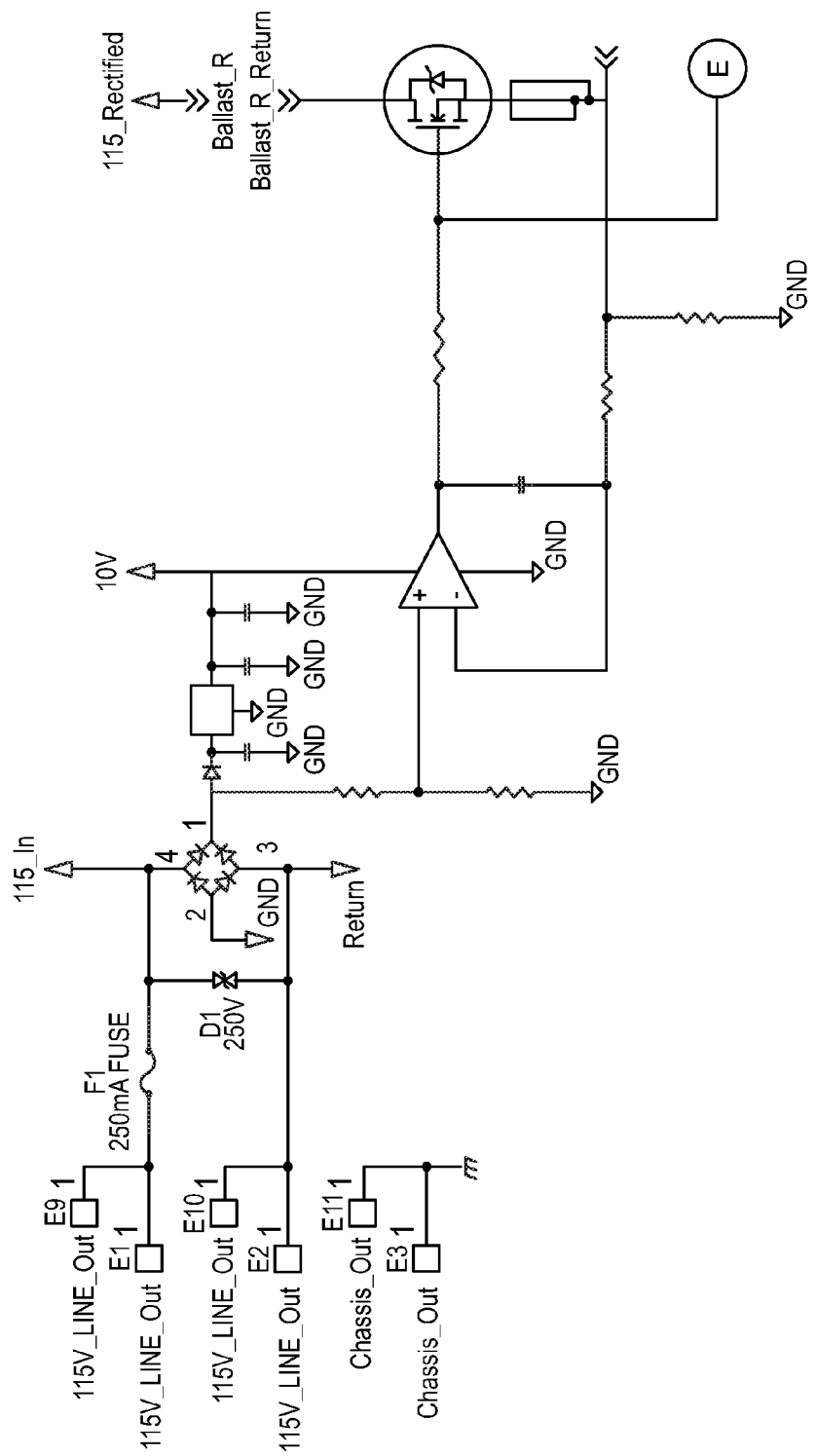
Figure 19B:
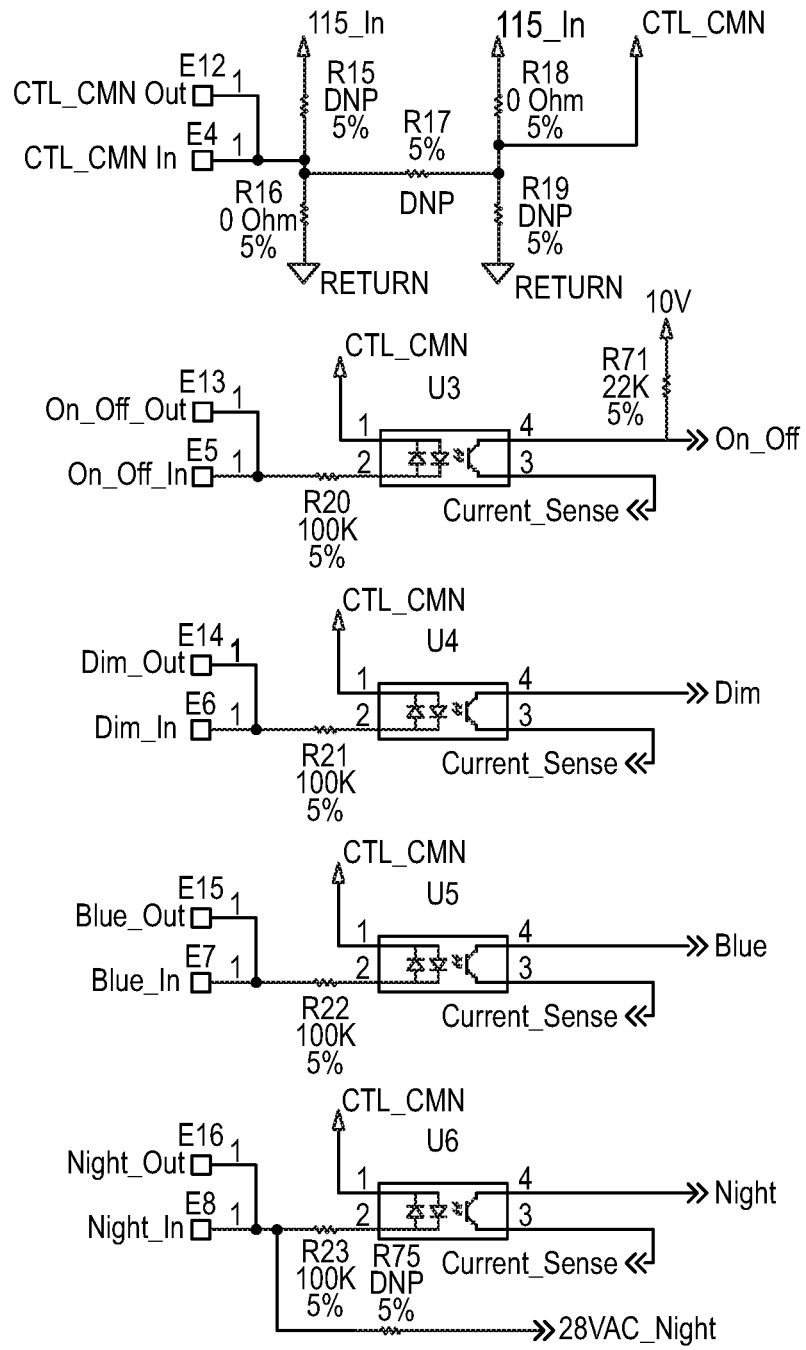
Figure 19C:
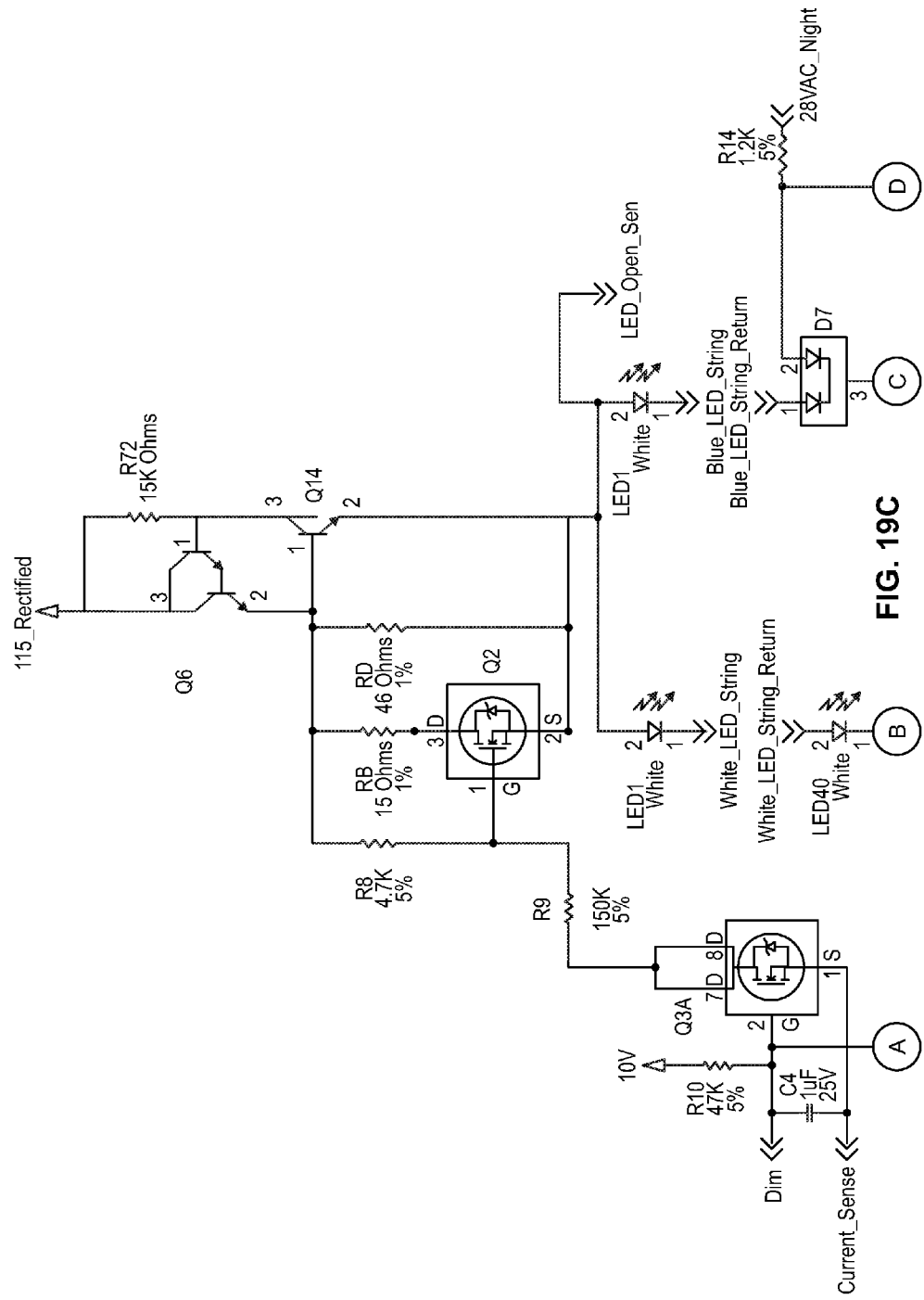
Figure 19D:
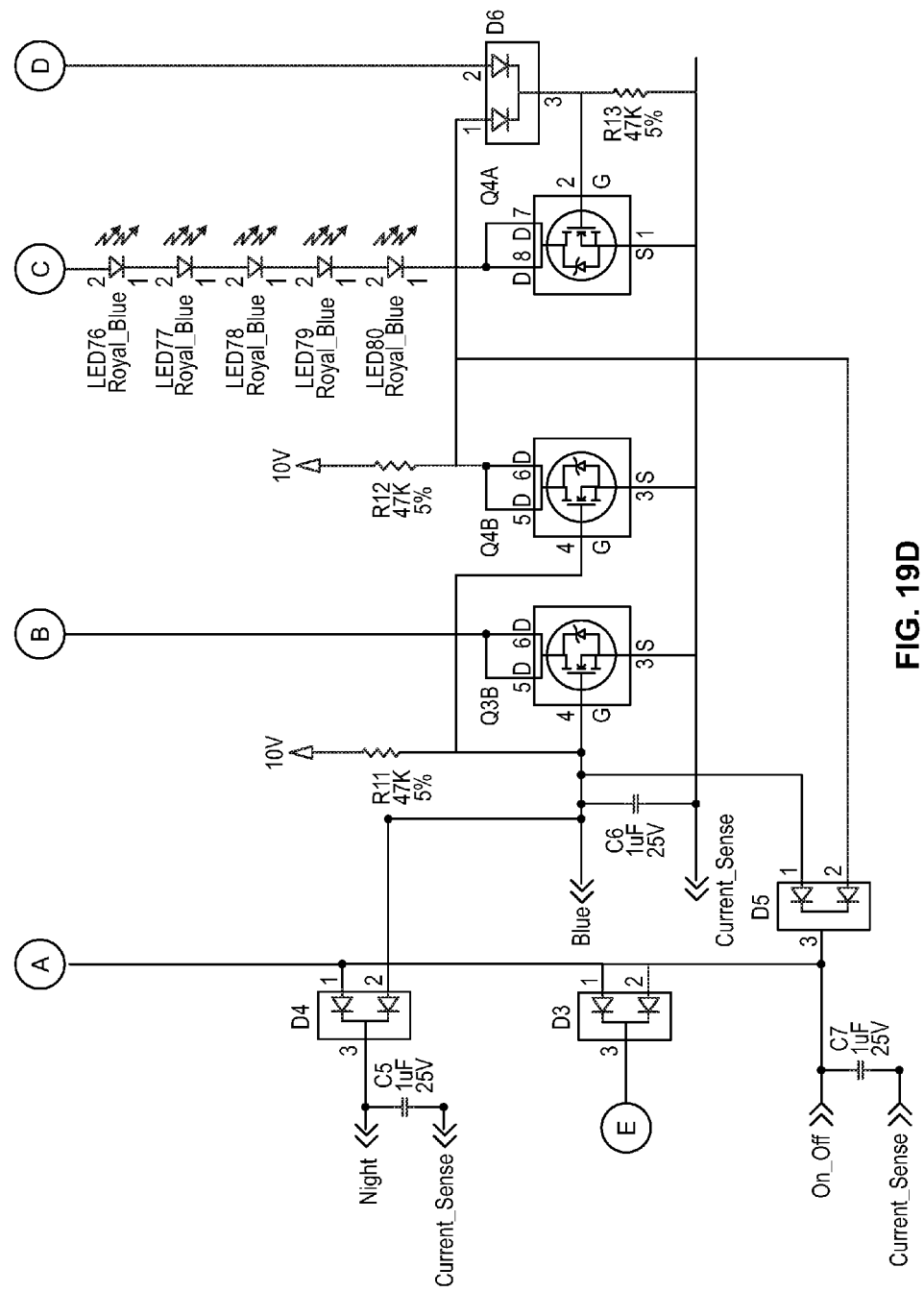
Figure 20G:
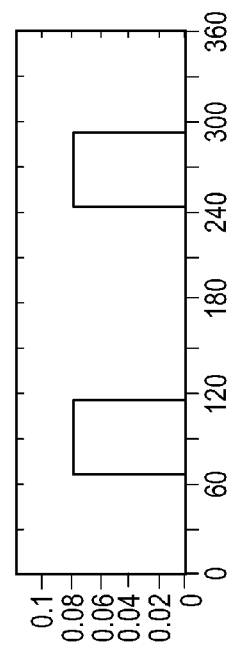
Figure 20H:
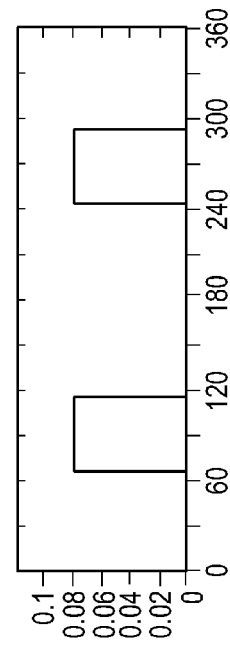
Figure 20I:
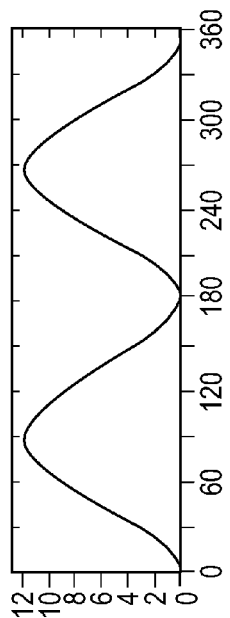
Figure 20J:
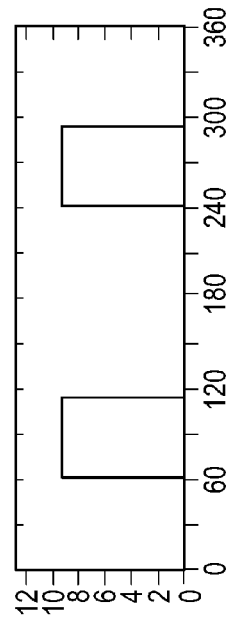
Figure 20K:
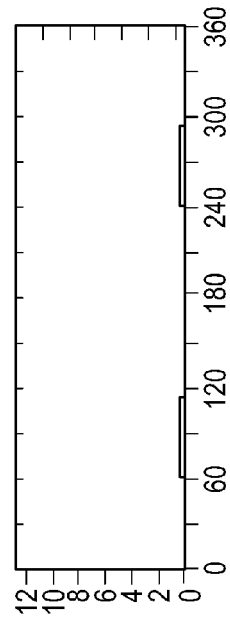
Figure 20L:
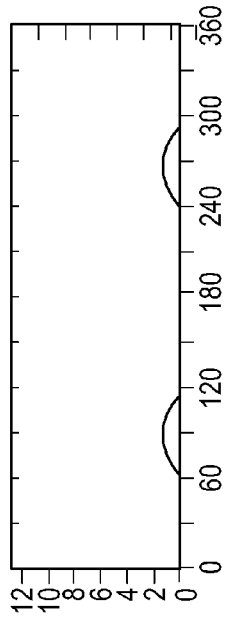
Figure 21A:
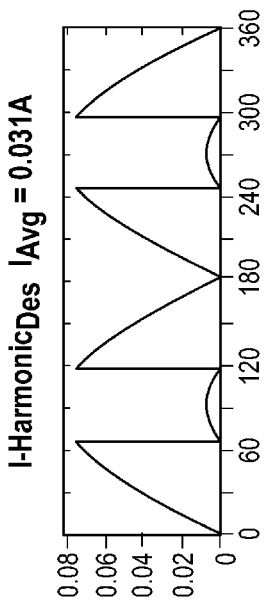
Figure 21B:
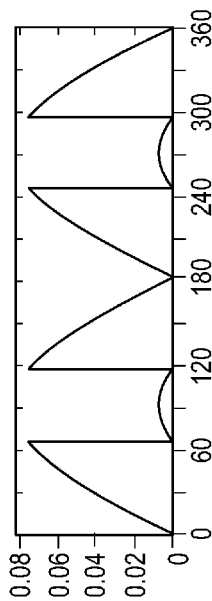
Figure 21C:
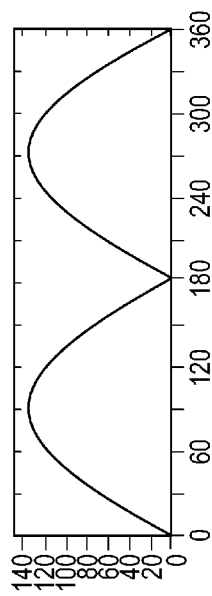
Figure 21D:
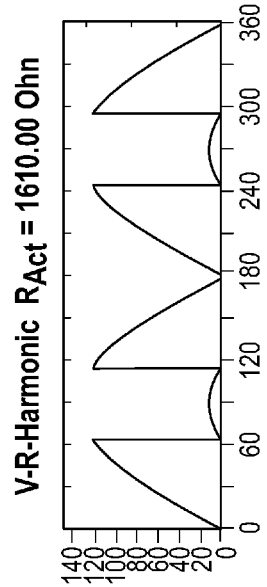
Figure 21E:
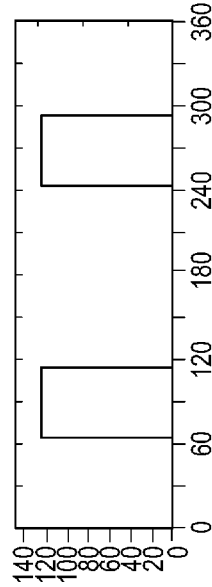
Figure 21F:
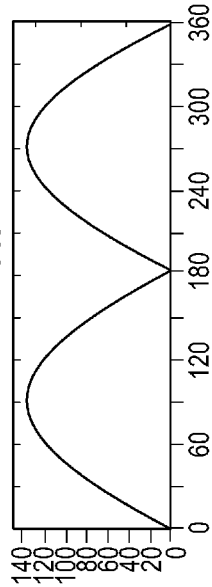
Figure 21G:
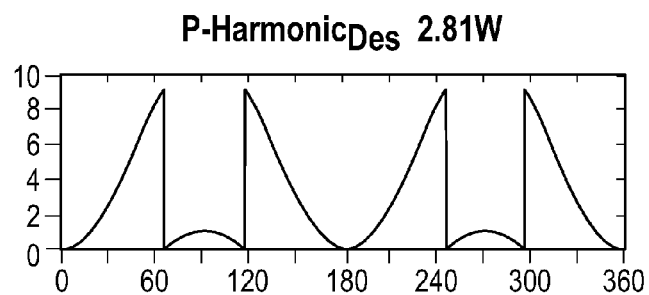
Figure 21H:
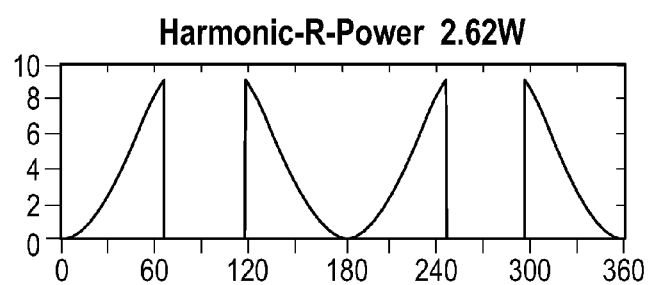
Figure 21I:
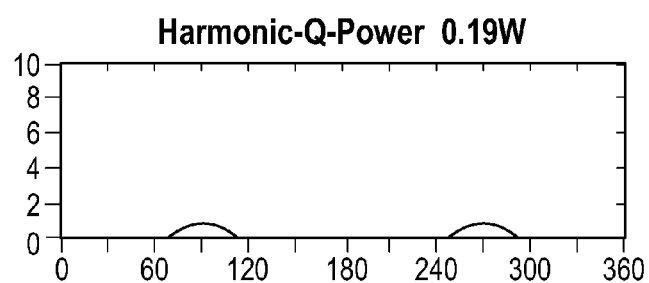
Figure 21J:
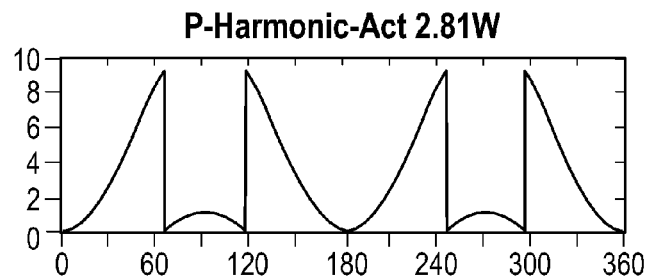
Figure 22A:
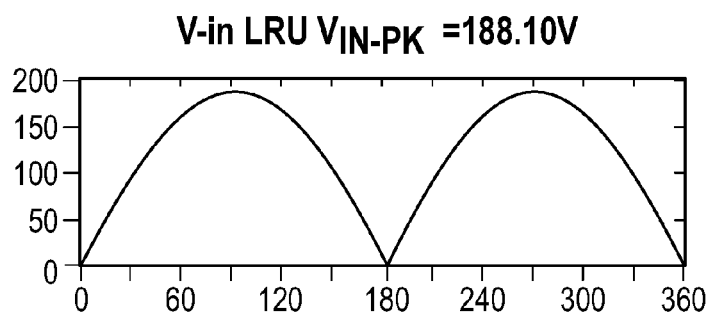
Figure 22B:
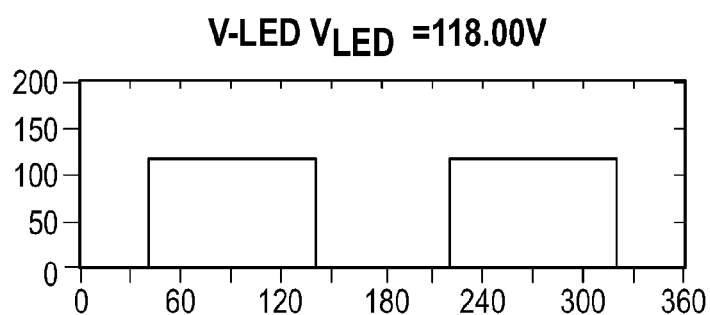
Figure 22C:
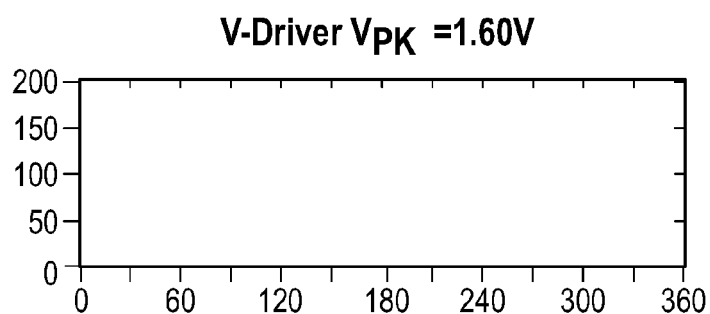
Figure 22D:
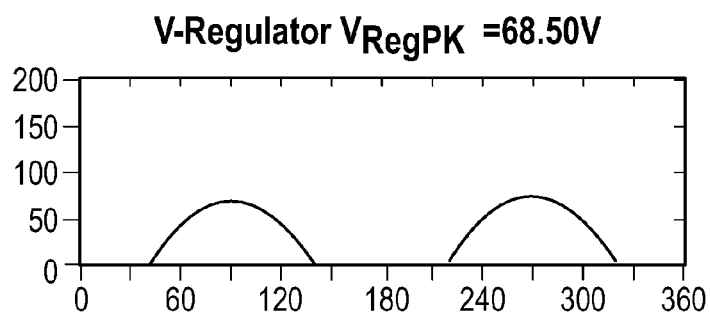
Figure 22E:
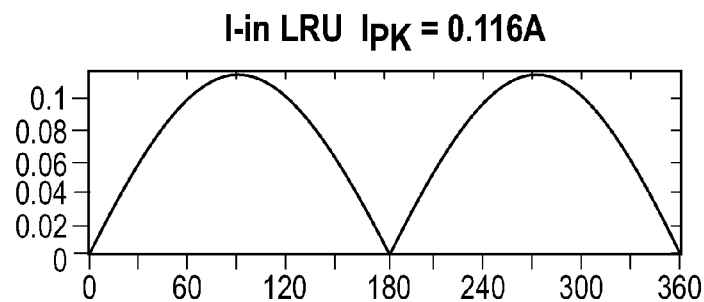
Figure 22F:
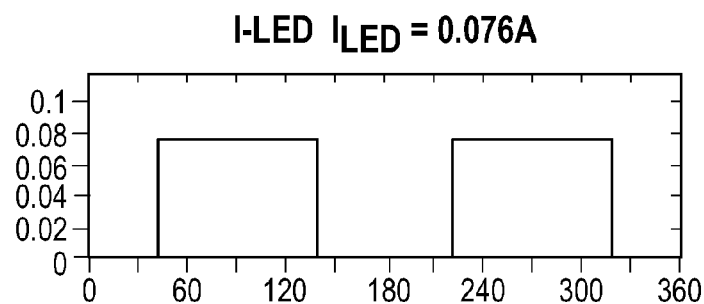
Figure 22G:
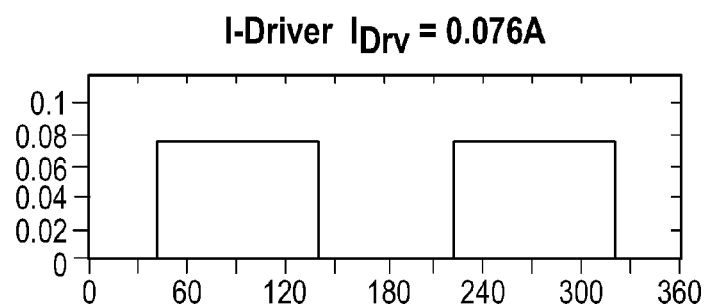
Figure 22H:
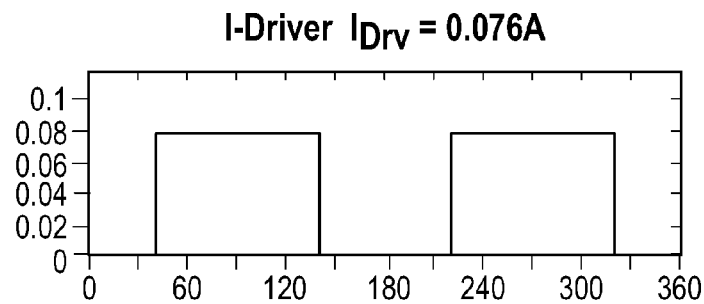
Figure 22I:
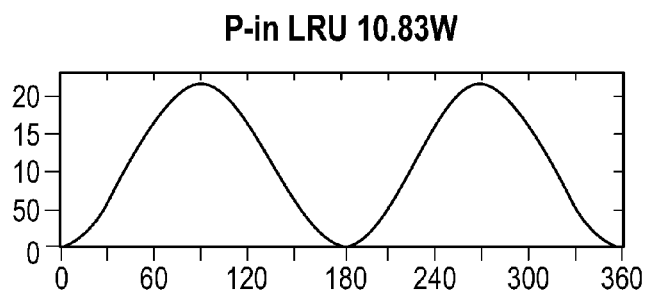
Figure 22J:
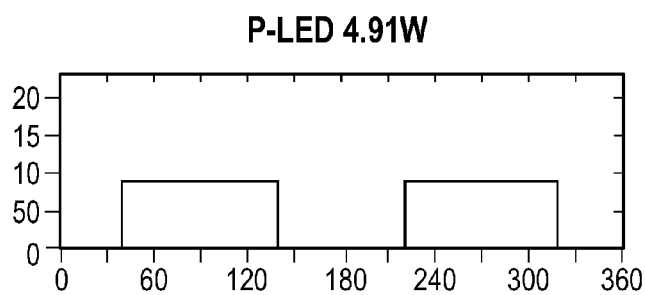
Figure 22K:
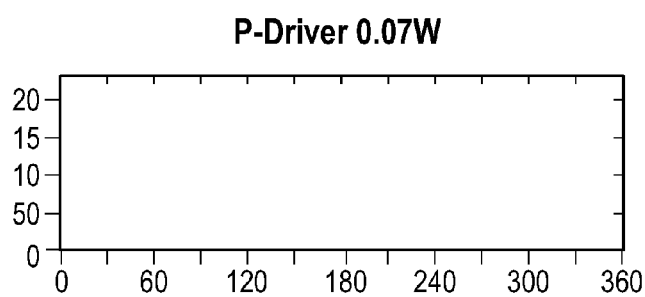
Figure 22L:
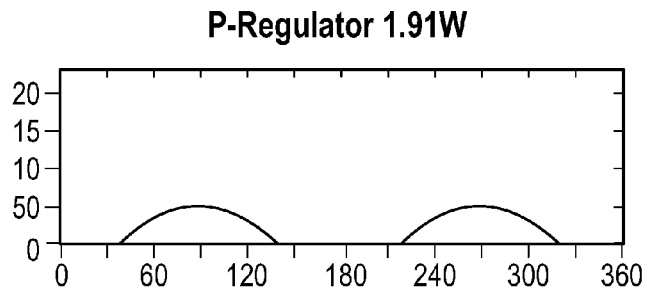
Figure 23A:
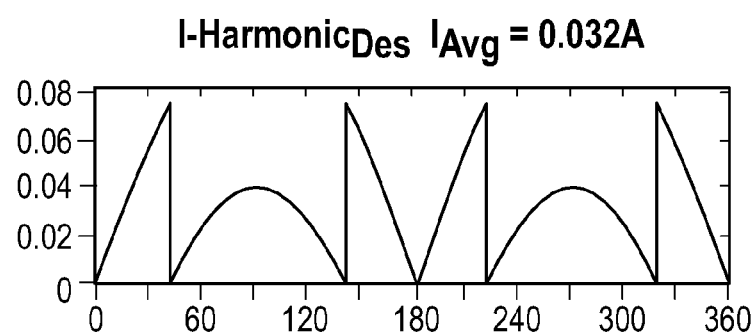
Figure 23B:
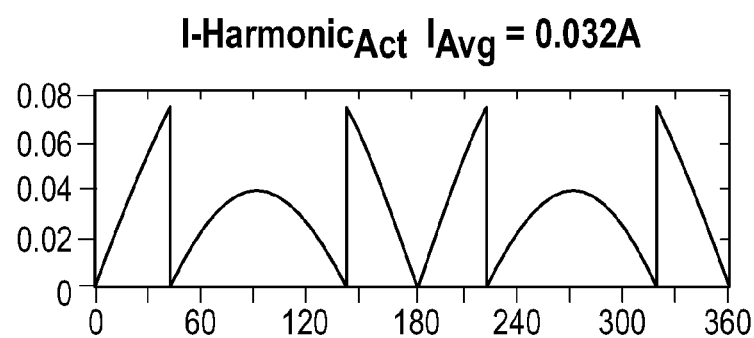
Figure 23C:
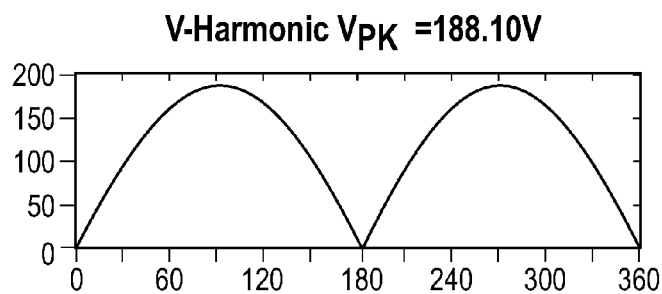
Figure 23D:
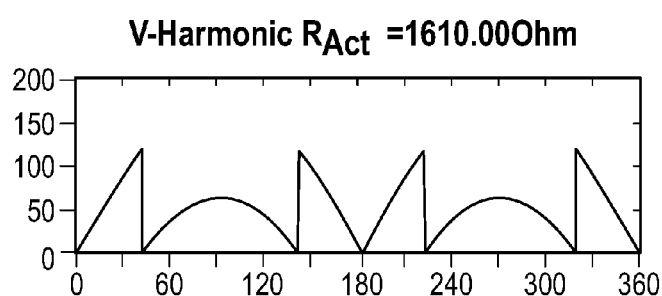
Figure 23E:
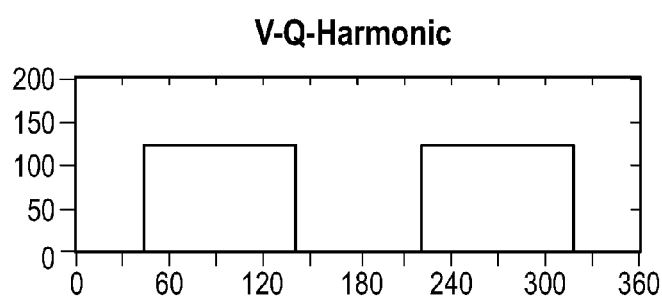
Figure 23F:
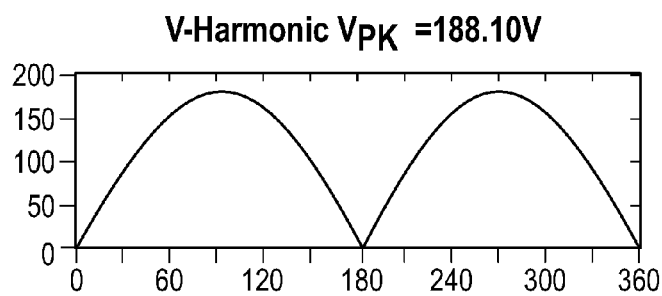
Figure 23G:
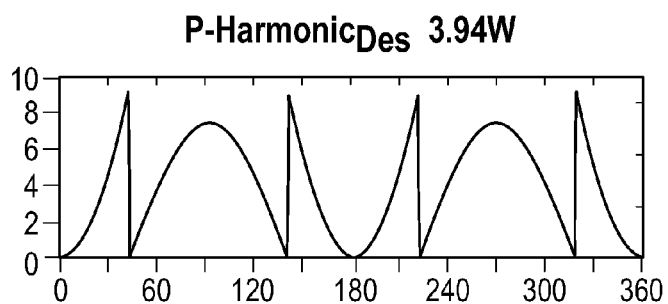
Figure 23H:
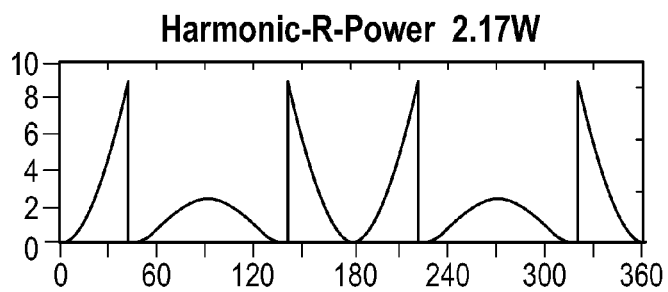
Figure 23I:
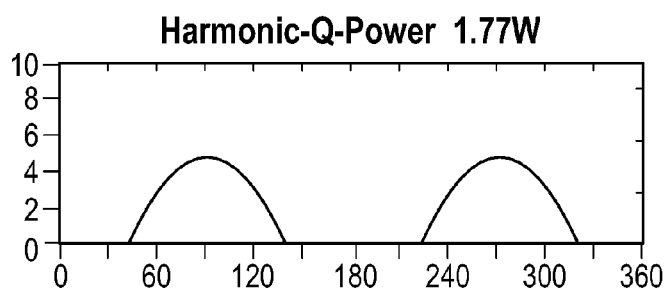
Figure 23J:
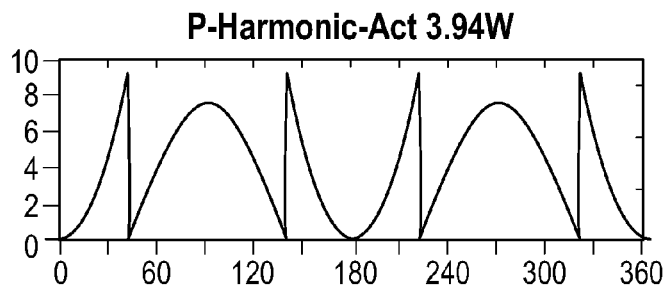
Figure 24:
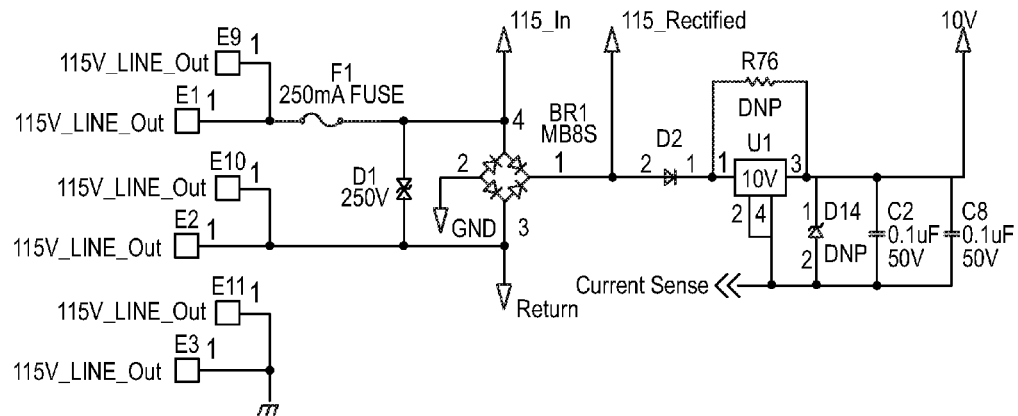
Figure 25:
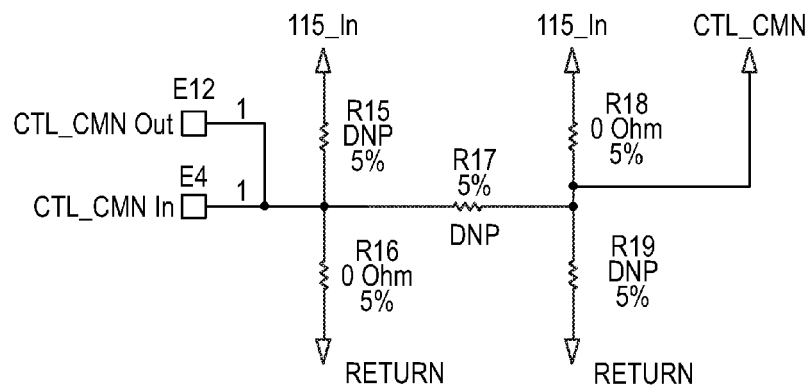
Figure 26:
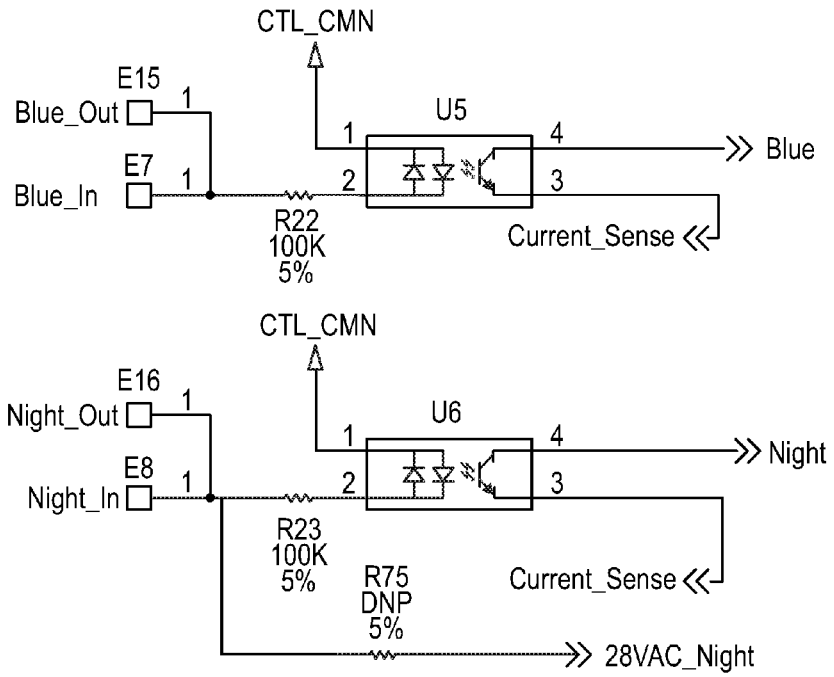
Figure 27:
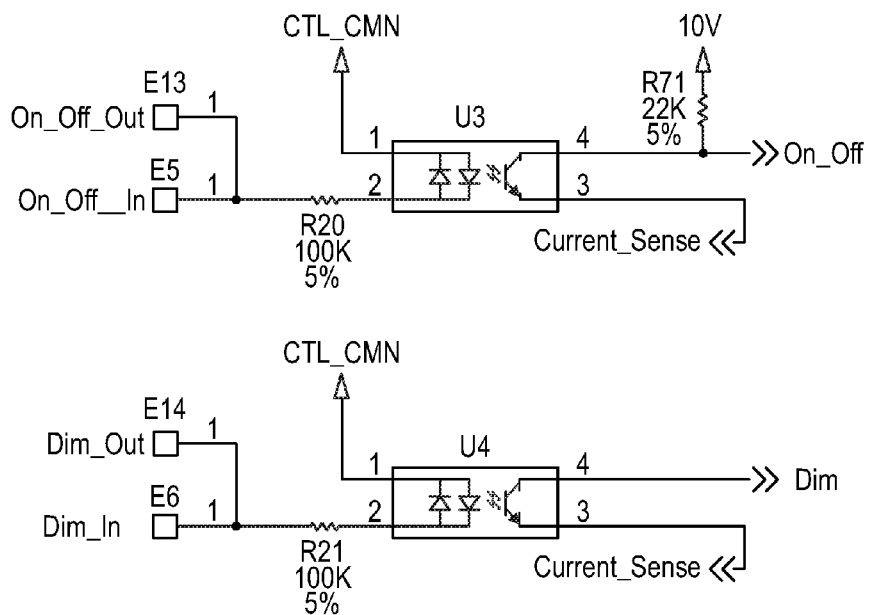
Figure 28A:
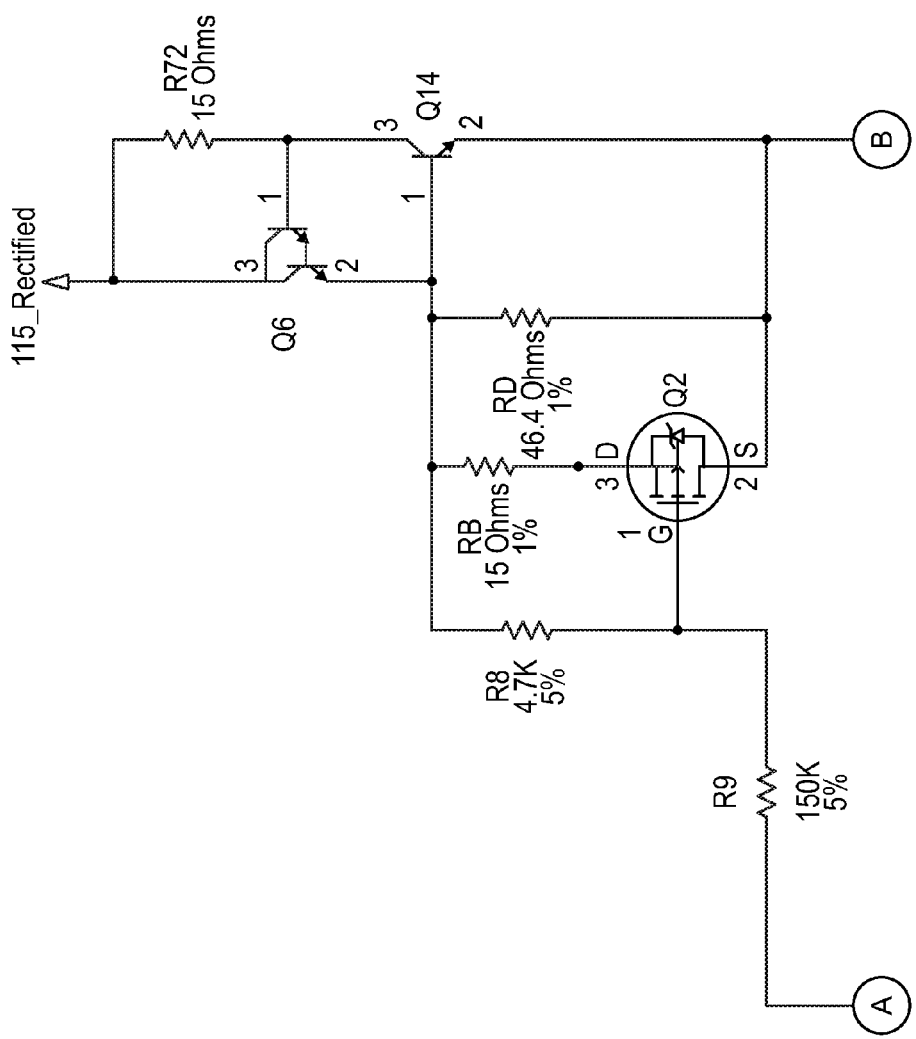
Figure 28B:
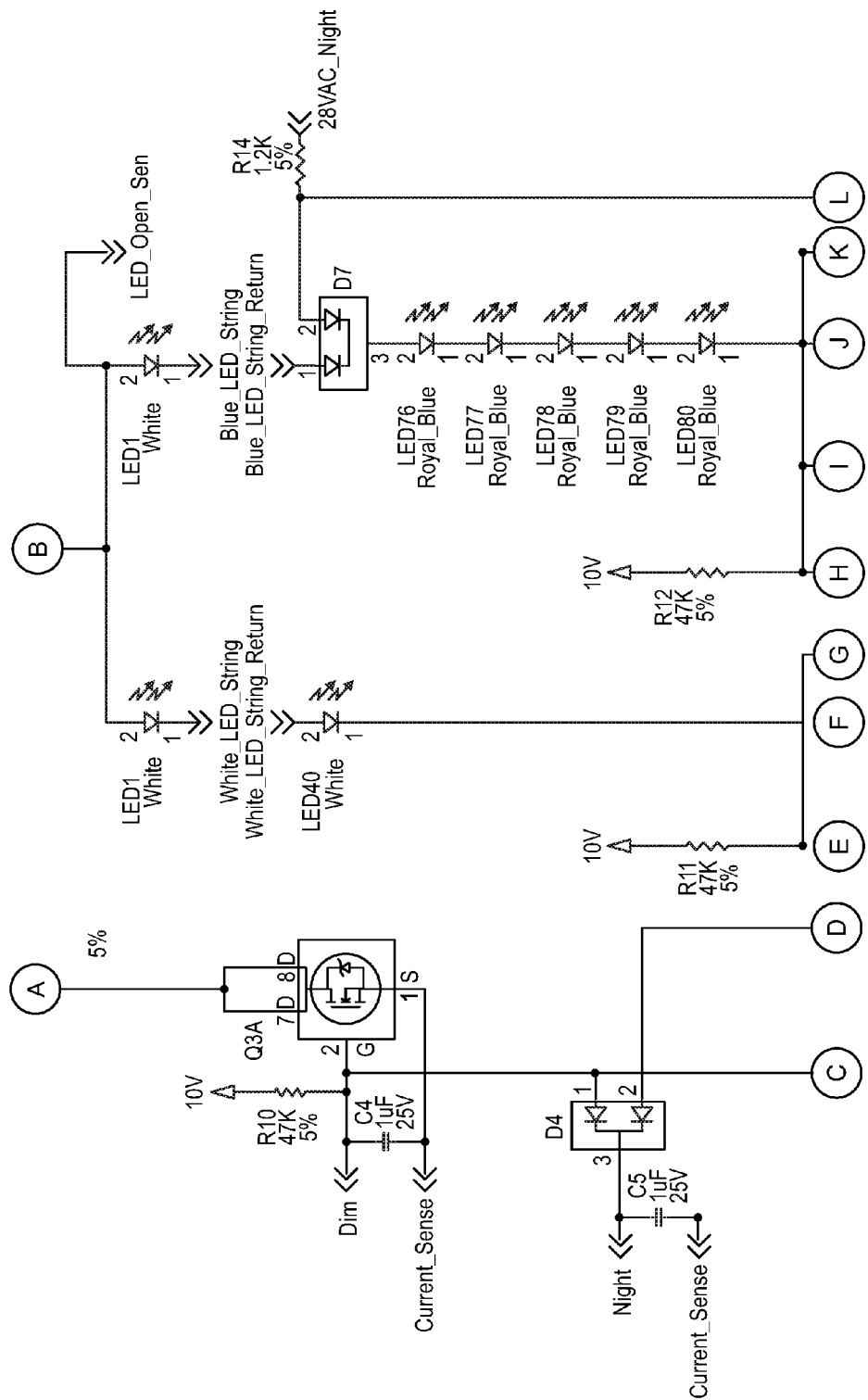
Figure 28C:
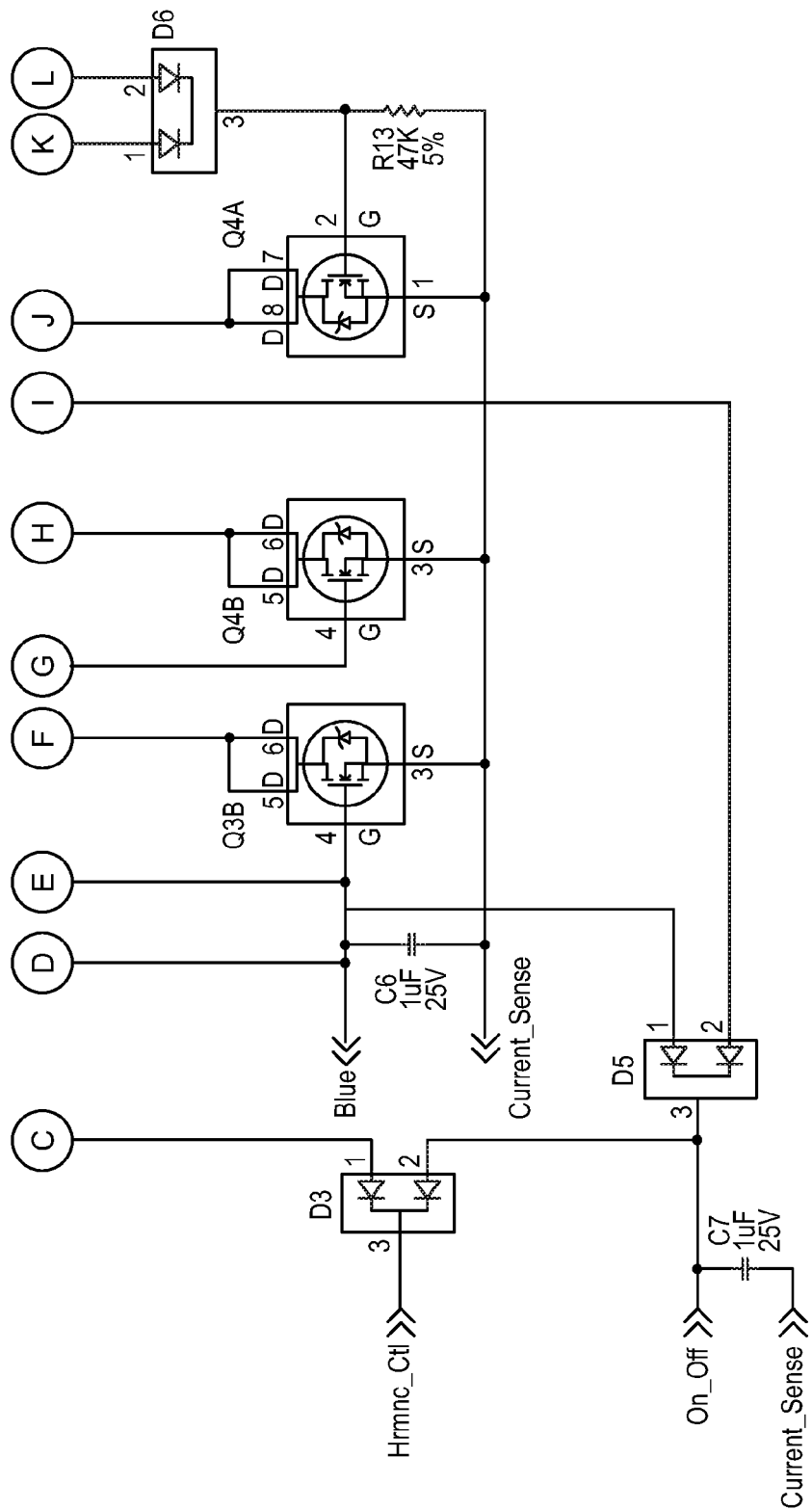
Figure 29:
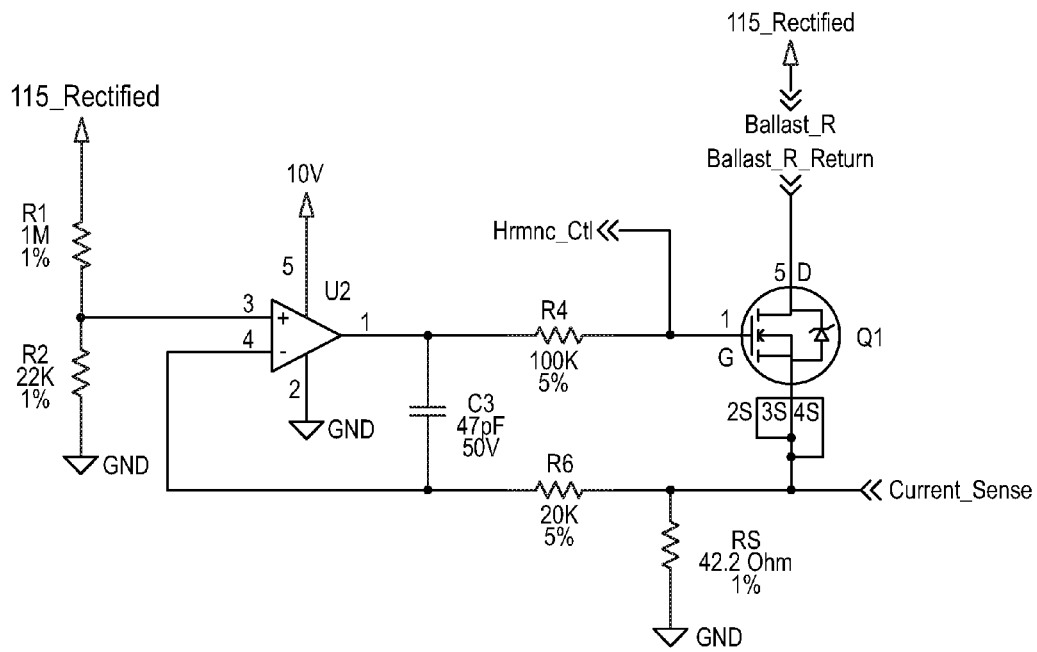
Figure 30:
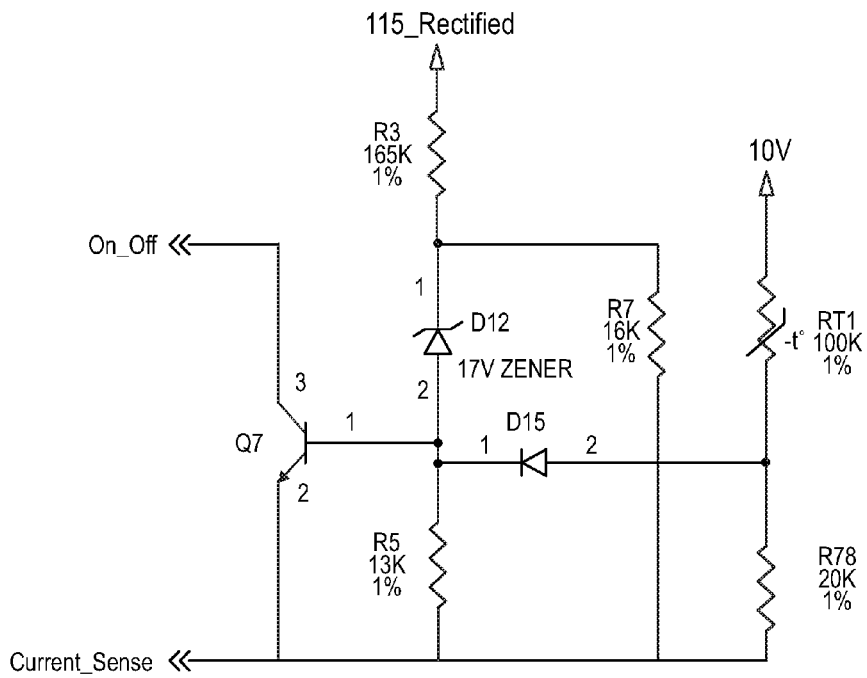

Turning to FIG. 18, in an embodiment, R1 and R2 (equivalent to the first and second divider resistors 224 and 226) supply a scaled version of the input voltage waveform to the non-inverting input of the op-amp. All of the circuit current returning to ground passes through RS (an implementation of the sense resistor 220), providing the signal to the inverting side of the op-amp (an implementation of the differential amplifier 222). The op-amp will attempt to drive Q1 (an implementation of the transistor 205) such that the voltage produced across RS will match the voltage supplied by R1/R2, resulting in a sinusoidal current waveform.

Turning to FIGS. 19A, 19B, 19C, and 19D (with further reference back to FIG. 13), in an embodiment, during the portion of the desired waveform that can be produced by a pure resistance, Q1 will be fully turned on, and the ballast resistor (an implementation of the ballast resistor 218) will conduct the necessary current.

According to various embodiments, the power consumption and current at various points in the circuit depicted in FIGS. 24-30 may be as follows (based on test data):

| Input Voltage | 97 VRMS | 115 VRMS | 134 VRMS |
|---|---|---|---|
| LRU Power (W) | 5.632 | 7.949 | 10.826 |
| LED Drive Current (mA) | 0.076 | 0.076 | 0.076 |
| LED Average Current (mA) | 0.022 | 0.034 | 0.042 |
| LED Power (W) | 2.539 | 4.023 | 4.907 |
| LED Driver Power (W) | 0.034 | 0.055 | 0.067 |
| LED Driver Reg. Power (W) | 0.252 | 0.971 | 1.913 |
| Harmonic Ballast Power (W) | 2.616 | 2.046 | 2.173 |
| Harmonic Transistor Power (W) | 0.191 | 0.854 | 1.767 |

The resulting power factor in a circuit implemented according to the present disclosure may be 1.00 with a total harmonic distortion of less than 1 percent, which compares favorably to a power factor of 0.95 to 0.99 and a total harmonic distortion of (at best) 3% in current commercial designs. Furthermore, since a circuit according to the present disclosure adapts to what the voltage is (and is not dependent on the input waveform or frequency), it can function in, for example, at 50-1000 Hertz. Furthermore, a triangle versus sinusoidal waveform is satisfactory.

FIGS. 20A-20L depict the electrical performance of the LED lights and LED driver shown in FIGS. 24-30 at 97 VRMS, according to an embodiment.

FIGS. 21A-21J depict the electrical performance of the harmonic correction circuit (shown in parts of FIGS. 24-30) at 97 VRMS, according to an embodiment.

FIGS. 22A-22L depict the electrical performance of the LED lights and LED driver shown in FIGS. 24-30 at 134 VRMS, according to an embodiment.

FIGS. 23A-23J depict the electrical performance of the harmonic correction circuit (shown in parts of FIGS. 24-30) at 134 VRMS, according to an embodiment.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A power harmonics correction circuit comprising:
   a first node;
   a second node;
   a first current path extending from the first node to the second node;
   a second current path extending from the first node to ground;
   a third current path extending from the first node to the second node;
   a sense resistor electrically connected to the second node and to ground, wherein the voltage across the sense resistor has a waveform whose shape and phase represent the shape and phase of the waveform of a current on the first current path;
   a differential circuit comprising a first input, a second input, and an output, wherein the first input is electrically connected to the second current path and the second input is electrically connected to the sense resistor;
   a transistor comprising a gate that is electrically connected to the output of the differential circuit, a drain that is electrically connected to the third current path, and a source that is electrically connected along the third current path so that transistor provides feedback to the second input of the differential circuit;
   a first divider resistor electrically connected along the second current path; and
   a second divider resistor electrically connected along the second current path, a third node being defined between the first and second resistors, wherein the first input of the differential circuit is electrically connected to the third node,
   wherein, during operation of the power harmonics correction circuit,
      when the current waveform changes, the change is reflected as a voltage change at the first input of the differential circuit;
      the differential circuit drives the transistor so as to equalize the voltage at the first and second inputs, resulting in a current waveform whose phase and shape are matched to that of the voltage waveform.

2. The power harmonics correction circuit of claim 1, further comprising a ballast resistor electrically connected to the first node and to the drain of the transistor, wherein the source of the transistor is electrically connected to the second node.

3. The power harmonics correction circuit of claim 1, further comprising logic circuitry that controls the driver to generate the signal.

4. A power harmonics correction circuit comprising:
   a first node;
   a second node;
   a first current path extending from the first node to the second node;
   a second current path extending from the first node to ground;
   a third current path extending from the first node to the second node;
   a sense resistor electrically connected to the second node and to ground, wherein the voltage across the sense resistor has a waveform whose shape and phase represent the shape and phase of the waveform of a current on the first current path;
   a differential circuit comprising a first input, a second input, and an output, wherein the first input is electrically connected to the second current path and the second input is electrically connected to the sense resistor; and
   a transistor comprising a gate that is electrically connected to the output of the differential circuit, a drain that is electrically connected to the third current path, and a source that is electrically connected along the third current path so that transistor provides feedback to the second input of the differential circuit,
   wherein, during operation of the power harmonics correction circuit,
      when the current waveform changes, the change is reflected as a voltage change at the first input of the differential circuit;
      the differential circuit drives the transistor so as to equalize the voltage at the first and second inputs, resulting in a current waveform whose phase and shape are matched to that of the voltage waveform, wherein the waveform on the first current path is a square waveform and the waveform of the sense resistor is a sinusoidal waveform whose shape and phase matches that of a sinusoidal waveform defined such that the square waveform fits within and extends to the lateral boundaries of the current waveform.

5. A light-emitting diode (LED) lighting unit comprising:

a first node;

a second node;

a first current path extending from the first node to the second node;

a second current path extending from the first node to ground;

a third current path extending from the first node to the second node;

a series of light emitting diodes connected along the first current path;

a driver that provides a voltage to the series of LEDs;

a differential circuit comprising a first input, a second input, and an output, wherein the first input is electrically connected a sense resistor and the second input is electrically connected to the second node, wherein a voltage across the sense resistor has a waveform whose shape and phase are representative of the shape and phase of a current on the first current path; and a transistor comprising a gate that is electrically connected to the output of the differential circuit, a drain that is electrically connected to the third current path, and a source that is electrically connected along the third current path so that transistor provides feedback to the second input of the differential circuit, wherein, during operation of the power harmonics correction circuit, when voltage provided to the series of LED lights exceeds the forward voltage, the resulting voltage change is reflected as a voltage change at the first input of the differential circuit;

the differential circuit drives the transistor so as to equalize the voltage at the first and second inputs, resulting in a current waveform whose phase and shape are matched to that of the voltage waveform.

6. The LED lighting unit of claim 5, further comprising a ballast resistor electrically connected to the first node and to the drain of the transistor, wherein the source of the transistor is electrically connected to the second node.

7. The LED lighting unit of claim 5, further comprising a first divider resistor electrically connected along the second current path and a second divider resistor electrically connected in series along the second current path, a third node being defined between the first and second divider resistors, wherein the first input of the differential circuit is electrically connected to the third node.

8. The LED lighting unit of claim 5, further comprising logic circuitry that controls the driver to generate the signal.

9. The LED lighting unit of claim 5, wherein the waveform on the first current path is a square waveform and the waveform of the sense resistor is a sinusoidal waveform whose shape and phase matches that of a sinusoidal waveform defined such that the square waveform fits within and extends to the lateral boundaries of the current waveform.

10. A method for reducing power harmonics in a light-emitting diode (LED) lighting unit, the method comprising:

providing an input current to a series of LED lights along a first circuit path from a first node to a second node;

sensing, at the second node, a voltage having a waveform whose shape and phase represent the shape and phase of the input current;

receiving the sensed voltage at a first input of a differential circuit, receiving, from a transistor, a feedback voltage at a second input of the differential circuit, wherein the transistor is electrically connected along a third current path that extends from the first node to the second node;

providing an output voltage from the differential circuit to a gate of the transistor; and adjusting the output voltage so as to maintain the voltage at the first input and the voltage at the second input substantially the same, thereby keeping the shape and phase of the waveforms of the sensed voltage and the input current substantially matched.

11. The method of claim 10, further comprising dividing voltage along the second current path among a plurality of divider resistors and providing the divided voltage to the first input.

12. The method of claim 10, wherein the waveform on the first current path is a square waveform and the waveform of the sense resistor is a sinusoidal waveform whose shape and phase matches that of a sinusoidal waveform defined such that the square waveform fits within and extends to the lateral boundaries of the current waveform.

* * * * *